United States Patent
Takashima et al.

(10) Patent No.: US 9,755,823 B2
(45) Date of Patent: Sep. 5, 2017

(54) CRYPTOGRAPHIC SYSTEM, CRYPTOGRAPHIC METHOD, AND COMPUTER READABLE MEDIUM

(71) Applicant: MITSUBISHI ELECTRIC CORPORATION, Tokyo (JP)

(72) Inventors: Katsuyuki Takashima, Tokyo (JP); Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/787,317

(22) PCT Filed: May 15, 2013

(86) PCT No.: PCT/JP2013/063538
§ 371 (c)(1),
(2) Date: Oct. 27, 2015

(87) PCT Pub. No.: WO2014/184894
PCT Pub. Date: Nov. 20, 2014

(65) Prior Publication Data
US 2016/0072625 A1 Mar. 10, 2016

(51) Int. Cl.
*H04L 9/18* (2006.01)
*H04L 9/08* (2006.01)
(Continued)

(52) U.S. Cl.
CPC ............ *H04L 9/0816* (2013.01); *H04L 9/065* (2013.01); *H04L 9/088* (2013.01); *H04L 9/30* (2013.01);
(Continued)

(58) Field of Classification Search
CPC ..................................................... H04L 9/0618
See application file for complete search history.

(56) References Cited

U.S. PATENT DOCUMENTS

| 7,634,085 | B1 | 12/2009 | Sahai et al. |
| 2009/0080658 | A1 | 3/2009 | Waters et al. |
| 2015/0318988 | A1 | 11/2015 | Kawai et al. |

FOREIGN PATENT DOCUMENTS

EP     2 947 810 A1    11/2015

OTHER PUBLICATIONS

Ichikawa, et al., "A Functional Encryption System Supporting Revocation", SCIS 2012, The 29th Symposium on Cryptography and Information Security Kanazawa, Japan, Jan. 30-Feb. 2, 2012, The Institute of Electronics, Information and Communication Engineers, pp. 1-7.

(Continued)

*Primary Examiner* — Josnel Jeudy
(74) *Attorney, Agent, or Firm* — Birch, Stewart, Kolasch & Birch, LLP

(57) ABSTRACT

It is an object to provide predicate encryption that can conceal both attribute information being set in a ciphertext and predicate information being set in a decryption key even in a public key setting. An encryption device 200 generates a ciphertext $ct_x$ in which attribute information x is set as a basis vector of a basis D. A conversion device 300 converts with conversion information W the basis D of the ciphertext $ct_x$ generated by the encryption device 200 to a basis B so as to generate a ciphertext $CT_x$. A decryption device 400 decrypts the ciphertext $CT_x$ generated by the conversion device 300 with a token $tk_v$ in which predicate information v is set as a coefficient of a basis vector of a basis B* corresponding to the basis B.

12 Claims, 14 Drawing Sheets

(51) Int. Cl.
*H04L 9/06* (2006.01)
*H04L 9/30* (2006.01)
(52) U.S. Cl.
CPC ........ *H04L 9/3073* (2013.01); *H04L 2209/42* (2013.01); *H04L 2209/46* (2013.01); *H04L 2209/76* (2013.01)

(56) References Cited

OTHER PUBLICATIONS

Katz et al., "Predicate Encryption Supporting Disjunctions, Polynomial Equations, and Inner Products", pp. 1-28, Apr. 13, 2008.
Kawai et al., "Fully-Anonymous Functional Proxy-Re-Encryption", [online], Jun. 2, 2013, [retrieved on Jun. 12, 2013 (Jun. 12, 2013)], Internet <URL:https://eprint.iacr.org/2013/318>. pp. 1-71.
Lewko et al., "New Techniques for Dual System Encryption and Fully Secure HIBE with Short Ciphertexts", pp. 1-21, Aug. 19, 2010.
Lewko et al., "Unbounded HIBE and Attribute-Based Encryption", 20 pages, Jul. 19, 2011.
Lewko, et al., "Decentralizing Attribute-Based Encryption", pp. 1-31, May 11, 2011.
Lewko, et al., "Fully Secure Functional Encryption: Attribute-Based Encryption and (Hierarchical) Inner Product Encryption", Mar. 9, 2011, pp. 1-56, http://eprint.iacr.org/2010/110.
Matsuda, et al, "Efficient Smart-Card-based Decryption in Functional Encryption", SCIS 2013, The 30th Symposium on Cryptography and Information Security Kyoto, Japan, Jan. 22-25, 2013, The Institute of Electronics, Information and Communication Engineers, pp. 1-4.
Okamoto et al., "Adaptively Attribute-Hiding (Hierarchical) Inner Product Encryption", [online], Oct. 3, 2011, [retrieved on Jun. 12, 2013], Internet <URL:https:// eprint.iacr.org/2011/543>.
Okamoto et al., "Efficient Attribute-Based Signatures for Non-Monotone Predicates in the Standard Model", Dec. 22, 2011, pp. 1-41.
Okamoto et al., "Hierarchical Predicate Encryption for Inner-Products", ASIACRYPT 2009, LNCS 5912, 2009, pp. 214-231, http://link.springer.com/content/j18752871068qw80/?print=true.
Okamoto et. al, "Fully Secure Functional Encryption with General Relations from the Decisional Linear Assumption", Mar. 9, 2011, pp. 1-49, http://eprint.iacr.org/2010/563.
Okamoto, et al., "Achieving Short Ciphertexts or Short Secret-Keys for Adaptively Secure General Inner-Product Encryption", CANS 2011, LNCS 7092, pp. 138-159, 2011.
Okamoto, et al., "Fully Secure Unbounded Inner-Product and Attribute-Based Encryption", Nov. 28, 2012, pp. 1-90.
Shen, et. al., "Predicate Privacy in Encryption Systems", Dec. 24, 2008, pp. 1-33.
Takashima et al., "Functional Encryption: the Latest Technology for Controlling Access Priviledge", Nikkei Electronics, Jul. 23, 2012, No. 1087, pp. 87-95.
Waters, "Dual System Encryption: Realizing Fully Secure IBE and HIBE under Simple Assumptions", pp. 1-37, 2009.
Katz et al., "Predicate Encryption Supporting Disjunctions, Polynomial Equations, and Inner Products", pp. 1-28, 2013.
Lewko et al., "New Techniques for Dual System Encryption and Fully Secure HIBE with Short Ciphertexts", pp. 1-21, Feb. 9, 2010.
Lewko et al., "Unbounded HIBE and Attribute-Based Encryption", 20 pages, Aug. 16, 2016.
Lewko, et al., "Decentralizing Attribute-Based Encryption", pp. 1-31, May 15, 2011.
Okamoto et al., "Hierarchical Predicate Encryption for Inner-Products", ASIACRYPT 2009, LNCS 5912, 2009, pp. 241-231, http://link.springer.com/content/j18752871068qw80/?print=true.
Waters, "Dual System Encryption: Realizing Fully Secure IBE and HIBE under Simple Assumptions", pp. 1-37, Aug. 19, 2009.
Okamoto et al., "Adaptively Attribute-Hiding (Hierarchical) Inner Product Encryption", International Association for Cryptologic Research, vol. 20120127:054631, Jan. 27, 2012, pp. 1-39, XP061005694.

CRYPTOGRAPHIC SYSTEM, CRYPTOGRAPHIC METHOD, AND COMPUTER READABLE MEDIUM

TECHNICAL FIELD

The present invention relates to predicate encryption that can conceal both attribute information being set in a ciphertext and predicate information being set in a decryption key.

BACKGROUND ART

Non-Patent Literature 1 discusses inner-product predicate encryption that can conceal both attribute information being set in a ciphertext and predicate information being set in a decryption key in a secret key setting in which both an encryption-side key and a decryption-side key are kept secret.

CITATION LIST

Non-Patent Literature

Non-Patent Literature 1: Emily Shen, Elaine Shi, and Brent Waters. Predicate privacy in encryption systems. In Omer Reingold, editor, TCC 2009, volume 5444 of LNCS, pages 457.473. Springer, 2009.

Non-Patent Literature 2: Allison B. Lewko, Tatsuaki Okamoto, Amit Sahai, Katsuyuki Takashima, and Brent Waters. Fully secure functional encryption: Attribute-based encryption and (hierarchical) inner product encryption. In Henri Gilbert, editor, EUROCRYPT 2010, volume 6110 of LNCS, pages 62.91. Springer, 2010. Full version is available at http://eprint.iacr.org/2010/110.

Non-Patent Literature 3: Okamoto, T., Takashima, K.: Achieving Short Ciphertexts or Short Secret-Keys for Adaptively Secure General Inner-Product Encryption. CANS 2011, LNCS, vol. 7092, pp. 138-159 Springer Heidelberg (2011).

Non-Patent Literature 4: Okamoto, T Takashima, K.: Fully Secure Unbounded Inner-Product and Attribute-Based Encryption. ePrint http://eprint.iacr.org/2012/671

SUMMARY OF INVENTION

Technical Problem

There has been no implementation of predicate encryption that can conceal both attribute information being set in a ciphertext and predicate information being set in a decryption key in a public key setting in which an encryption-side key is made public.

It is an object of the present invention to provide predicate encryption that can conceal both attribute information being set in a ciphertext and predicate information being set in a decryption key even in the public key setting.

Solution to Problem

A cryptographic system according to the present invention includes an encryption device to generate a ciphertext $ct_x$ in which attribute information x is set as a coefficient of a basis vector of a basis D;

a conversion device to convert with conversion information W the basis D of the ciphertext $ct_x$ generated by the encryption device to a basis B so as to generate a ciphertext $CT_x$; and a decryption device to decrypt the ciphertext $CT_x$ generated by the conversion device with a token $tk_v$ in which predicate information v is set as a coefficient of a basis vector of a basis B* corresponding to the basis B.

Advantageous Effects of Invention

By employing conversion information W and a conversion device, a cryptographic system according to the present invention can implement predicate encryption that can conceal both attribute information being set in a ciphertext and predicate information being set in a decryption key even in the public key setting.

DESCRIPTION OF EMBODIMENTS

Figure 1:
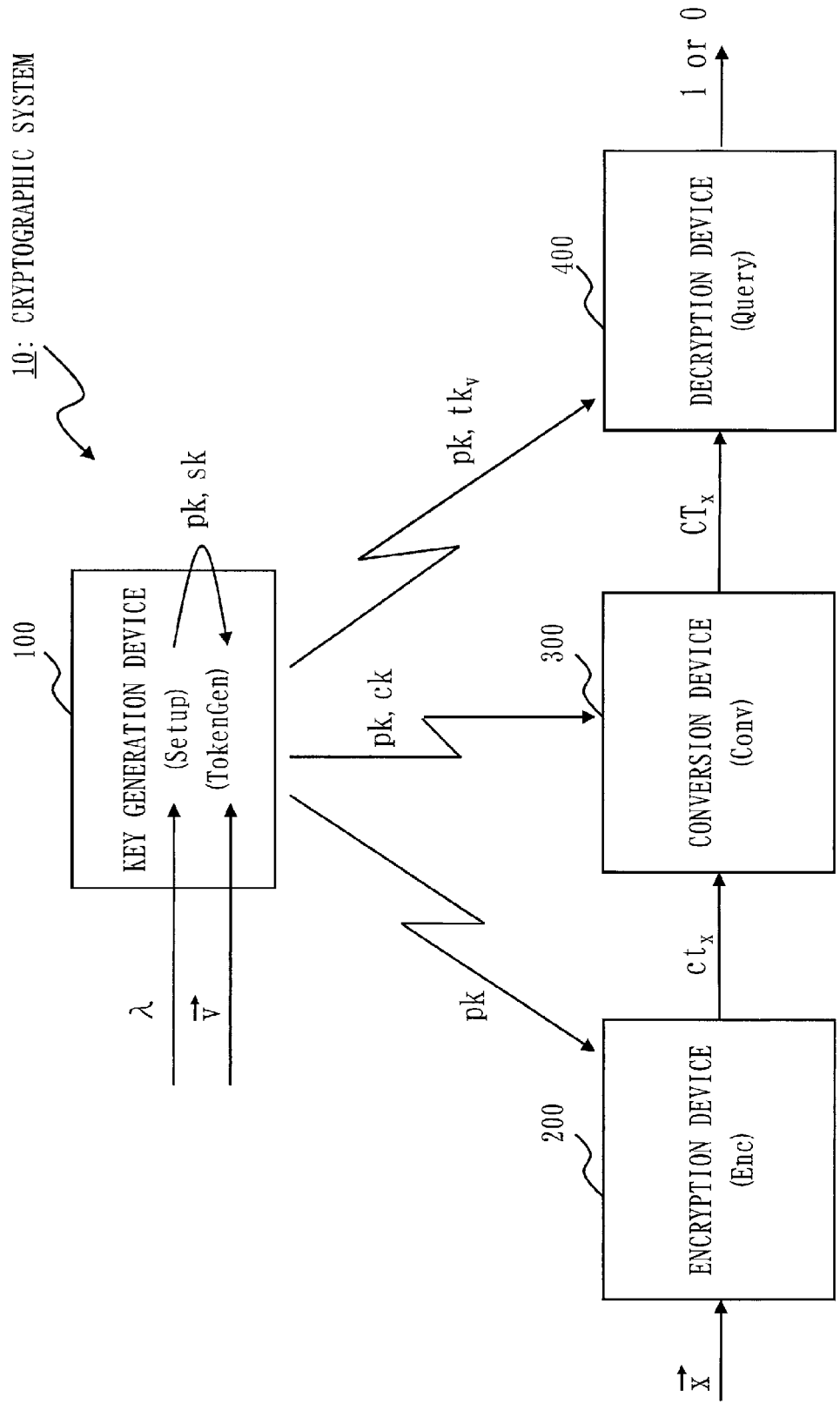
FIG. 1 is a configuration diagram of a cryptographic system 10 according to Embodiment 1.

Notations to be used in the following description will be described.

When A is a random variable or distribution, Formula 101 denotes that y is randomly selected from A according to the distribution of A. That is, y is a random number in Formula 101.

[Formula 101]

$$y \xleftarrow{R} A$$

When A is a set, Formula 102 denotes that y is uniformly selected from A. That is, y is a uniform random number in Formula 102.

[Formula 102]

$$y \xleftarrow{U} A$$

Formula 103 denotes that y is defined, defined, or substituted by z.

$$y := z \quad \text{[Formula 103]}$$

When a is a fixed value, Formula 104 denotes that a machine (algorithm) A outputs a on input x.

$$A(x) \to a \quad \text{[Formula 104]}$$

For example, $$A(x) \to 1$$

Formula 105, namely $F_q$, denotes a finite field of order q.

$$\mathbb{F}_q \quad \text{[Formula 105]}$$

A vector symbol denotes a vector representation over the finite field $F_q$, as indicated in Formula 106.

$\vec{x}$ denotes $$(x_1, \ldots, x_n) \in \mathbb{F}_q^n \quad \text{[Formula 106]}$$

Formula 107 denotes the inner-product, indicated in Formula 109, of two vectors $\vec{x}$ and $\vec{v}$ indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 108]}$$

$$\sum_{i=1}^{n} x_i v_i \quad \text{[Formula 109]}$$

Note that $X^T$ denotes the transpose of a matrix X.

For a basis B and a basis B* indicated in Formula 110, Formula 111 is defined.

$$\mathbb{B} := (b_1, \ldots, b_N),$$

$$\mathbb{B}^* := (b^*_1, \ldots, b^*_N) \quad \text{[Formula 110]}$$

$$(x_1, \ldots, x_N)_{\mathbb{B}} := \sum_{i=1}^{N} x_i b_i,$$

$$(y_1, \ldots, y_N)_{\mathbb{B}^*} := \sum_{i=1}^{N} y_i b^*_i \quad \text{[Formula 111]}$$

In the following description, when "δi,j" is represented as a superscript, this δi,j denotes $\delta_{i,j}$.

When "→" denoting a vector is attached to a subscript or superscript, it is meant that this "→" is attached as a superscript to the subscript or superscript.

In the following description, cryptographic processes include a key generation process, an encryption process, a conversion process, and a decryption process (query process).

Embodiment 1

Basic concepts for an inner-product predicate encryption scheme will be described first, and then an inner-product predicate encryption scheme will be described in which both attribute information being set in a ciphertext and predicate information being set in a decryption key can be concealed even in a public key setting.

First, the background to the concealment of both the attribute information being set in the ciphertext and the predicate information being set in the decryption key will be described.

Second, a space having a rich mathematical structure called "dual pairing vector spaces (DPVS)" which is a space for implementing the inner-product predicate encryption scheme will be described.

Third, a key technique for constructing the inner-product predicate encryption scheme according to Embodiment 1 will be described.

Fourth, the inner-product predicate encryption scheme according to Embodiment 1 will be described.

<1. Background>

There is a practice in which, for example, a hospital or the like accumulates the DNA information of patients in a database, and a pharmaceutical company or the like searches the database using a search query to investigate whether there is specific regularity in the DNA information of patients having a certain disease.

The DNA information of patients is private information. For pharmaceutical companies and the like, search queries need to be kept secret in the light of development strategies for pharmaceutical products.

In predicate encryption and the like, a ciphertext is generated by setting the DNA information or the like of a patient as attribute information, and a search query is generated by setting a search condition as predicate information.

However, in the conventional public key setting, there is a risk that a search condition cannot be concealed even if the DNA information of a patient can be concealed. This is because the public key setting allows a ciphertext to be freely generated based on a public key, so that it may be possible to execute a search query on the generated ciphertext and deduce a search condition which is set in the search query.

The inner-product predicate encryption scheme discussed in Non-Patent Literature 1 can conceal both the DNA information of a patient and a search condition in the secret key setting.

However, in the secret key setting, a secret key is required to generate a ciphertext, which is highly inconvenient from a practical point of view. Thus, there has been a demand for a scheme which can conceal both the DNA information of a patient and a search condition in the public key setting.

<2. Dual Pairing Vector Spaces>

The inner-product predicate encryption scheme to be described hereinafter is implemented in dual pairing vector spaces.

First, symmetric bilinear pairing groups will be described.

Symmetric bilinear pairing groups $(q, G, G_T, g, e)$ are a tuple of a prime q, a cyclic additive group G of order q, a cyclic multiplicative group $G^T$ of order q, $g \neq 0 \in G$, and a polynomial-time computable nondegenerate bilinear pairing e: $G \times G \to G_T$. The nondegenerate bilinear pairing signifies $e(sg, tg) = e(g, g)^{st}$, and $e(g, g) \neq 1$.

In the following description, let $G_{bpg}$ be an algorithm that takes as input $1^\lambda$ and outputs values of a parameter $param_G := (q, G, G_T, g, e)$ of bilinear pairing groups with a security parameter λ.

Dual pairing vector spaces will now be described.

Dual pairing vector spaces $(q, V, G_T, A, e)$ can be constructed by a direct product of the symmetric bilinear pairing groups $(param_G := (q, G, G_T, g, e))$. The dual pairing vector spaces $(q, V, G_T, A, e)$ are a tuple of a prime q, an N-dimensional vector space V over $F_q$ indicated in Formula 112, a cyclic group $G_T$ of order q, and a canonical basis $A := (a_1, \ldots, a_N)$ of the space V, and have the following operations (1) and (2), where $a_i$ is as indicated in Formula 113.

[Formula 112]

$$\mathbb{V} := \overbrace{\mathbb{G} \times \cdots \times \mathbb{G}}^{N}$$

[Formula 113]

$$a_i := (\overbrace{0, \ldots, 0}^{i-1}, g, \overbrace{0, \ldots, 0}^{N-i})$$

Operation (1): Nondegenerate Bilinear Pairing

A pairing in the space V is defined by Formula 114.

$$e(x,y) := \Pi_{i=1}^N e(G_i, H_i) \in \mathbb{G}_T \quad \text{[Formula 114]}$$

where $(G_1, \ldots, G_N) := x \in \mathbb{V}$, $(H_1, \ldots, H_N) := y \in \mathbb{V}$ This is nondegenerate bilinear, that is, $e(sx, ty) = e(x, y)^{st}$ and if $e(x, y) = 1$ for all $y \in V$ then $x = 0$. For all i and j, $e(a_i, a_j) = e(g, g)^{\delta_{i,j}}$, where $\delta_{i,j} = 1$ if $i = j$, and $\delta_{i,j} = 0$ if $i \neq j$, and $e(g, g) \neq 1 \in G_T$.

Operation (2): Distortion Maps

Linear transformations $\phi_{i,j}$ on the space V indicated in Formula 115 can achieve Formula 116.

[Formula 115]

If $\phi_{i,j}(a_j) = a_i$ and
$k \neq j$, then $\phi_{i,j}(a_k) = 0$.

[Formula 116]

$$\phi_{i,j}(x) := (\overbrace{0, \ldots, 0}^{i-1}, g_j, \overbrace{0, \ldots, 0}^{N-i})$$

where $(g_1, \ldots g_N) := x$

The linear transformations $\phi_{i,j}$ will be called distortion maps.

In the following description, let $G_{dpvs}$ be an algorithm that takes as input $1^\lambda$ ($\lambda \in$ natural number), $N \in$ natural number, and values of a parameter $\text{param}_G := (q, G, G_T, g, e)$ of bilinear pairing groups, and outputs values of a parameter $\text{param}_V := (q, V, G_T, A, e)$ of dual pairing vector spaces with a security parameter $\lambda$ and an N-dimensional space V.

Description will be directed herein to a case where the dual pairing vector spaces are constructed using the above-described symmetric bilinear pairing groups. The dual pairing vector spaces can also be constructed using asymmetric bilinear pairing groups. The following description can easily be adapted to a case where the dual pairing vector spaces are constructed using asymmetric bilinear pairing groups.

<3. Key Technique>

To achieve the concealment of both attribute information and predicate information, a new trapdoor (conversion key W to be described later) is employed between a public key and a secret key (alternatively, between a ciphertext and a token).

First, random dual bases B and B* on dual pairing vector spaces are generated. Then, using the conversion key W which is a random matrix, a subbasis B^ of the basis B is linearly transformed to generate a new basis D^ (:=B^·W). The basis D^ is uniformly and independently distributed from the basis B. Then, the basis D^ is output as the public key, and a subbasis B*^ of the basis B* is output as the secret key. The basis D^ and the basis B*^ are independent from each other if W is not considered.

An original ciphertext generated by an encrypting party and a token for search inherit this independence property from the key pair.

Using the trapdoor W (conversion key W), an intermediary different from the encrypting party converts the original ciphertext to a searchable ciphertext which is related to the token through the dual orthonormal property of the bases B and B*. Then, the converted ciphertext is searched for with the token.

<4. Inner-Product Predicate Encryption Scheme>

A scheme for inner-product predicate encryption with ciphertext conversion (Inner Product Encryption with Ciphertext Conversion, IPE-CC) will be described.

In the IPE-CC scheme, attribute information of inner-product predicates is represented as an attribute vector $\vec{x} \in F_q^n \setminus \{\vec{0}\}$, and predicate information ($f_{\vec{v}}$) is represented as a predicate vector $\vec{v}$, where $f_{\vec{v}}(\vec{x}) = 1$ only if $\vec{v} \cdot \vec{x} = 0$.

The IPE-CC scheme includes five probabilistic polynomial-time algorithms: Setup, TokenGen, Enc, Conv, and Query.

(Setup)

A Setup algorithm takes as input a security parameter $1^\lambda$, and outputs a public key pk, a conversion key ck, and a secret key sk (master secret key).

(TokenGen)

A TokenGen algorithm takes as input the public key pk, the secret key sk, and a predicate vector $\vec{v}$, and outputs a token $tk_v$ (decryption key).

(Enc)

An Enc algorithm takes as input the public key pk and an attribute vector $\vec{x}$, and outputs a ciphertext $ct_x$.

(Conv)

A Conv algorithm takes as input the public key pk, the conversion key ck, and the ciphertext $ct_x$, and outputs a converted ciphertext $CT_x$.

(Query)

A Query algorithm takes as input the public key pk, the token $tk_v$, and the converted ciphertext $CT_x$, and outputs 0 or 1 indicating a value of a predicate $f_{\vec{v}}$ concerning the predicate vector $\vec{v}$ which is evaluated based on the attribute vector $\vec{x}$.

A cryptographic system 10 that executes the algorithms of the IPE-CC scheme will be described.

FIG. 1 is a configuration diagram of the cryptographic system 10 according to Embodiment 1.

The cryptographic system 10 includes a key generation device 100, an encryption device 200, a conversion device 300, and a decryption device 400.

The key generation device 100 executes the Setup algorithm taking as input a security parameter $\lambda$, and thus generates a public key pk, a conversion key ck, and a secret key sk. Then, the key generation device 100 publishes the public key pk, and transmits the conversion key ck to the conversion device 300 in secrecy. The key generation device 100 also executes the TokenGen algorithm taking as input the public key pk, the secret key sk, and a predicate vector $\vec{v}$, and thus generates a token $tk_v$, and transmits the token $tk_v$ to the decryption device 400 in secrecy.

The encryption device 200 executes the Enc algorithm taking as input the public key pk and an attribute vector $\vec{x}$, and thus generates a ciphertext $ct_x$.

The conversion device 300 executes the Conv algorithm taking as input the public key pk, the conversion key ck, and the ciphertext $ct_x$, and thus generates a ciphertext $CT_x$.

The decryption device 400 executes the Query algorithm taking as input the public key pk, the token $tk_v$, and the ciphertext $CT_x$, and outputs 0 or 1.

Figure 2:
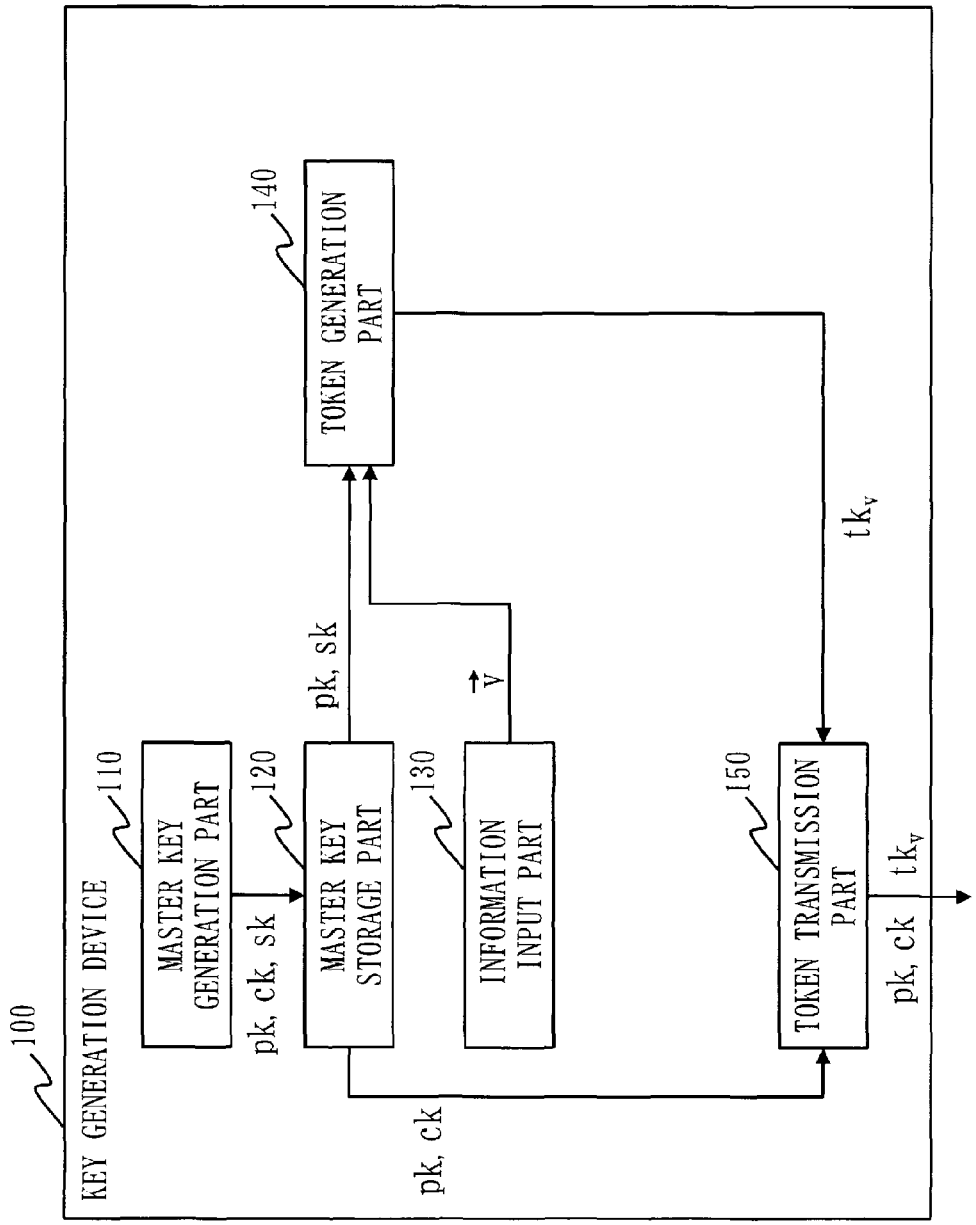
FIG. 2 is a functional block diagram illustrating the function of a key generation device 100 according to Embodiment 1.
Figure 3:
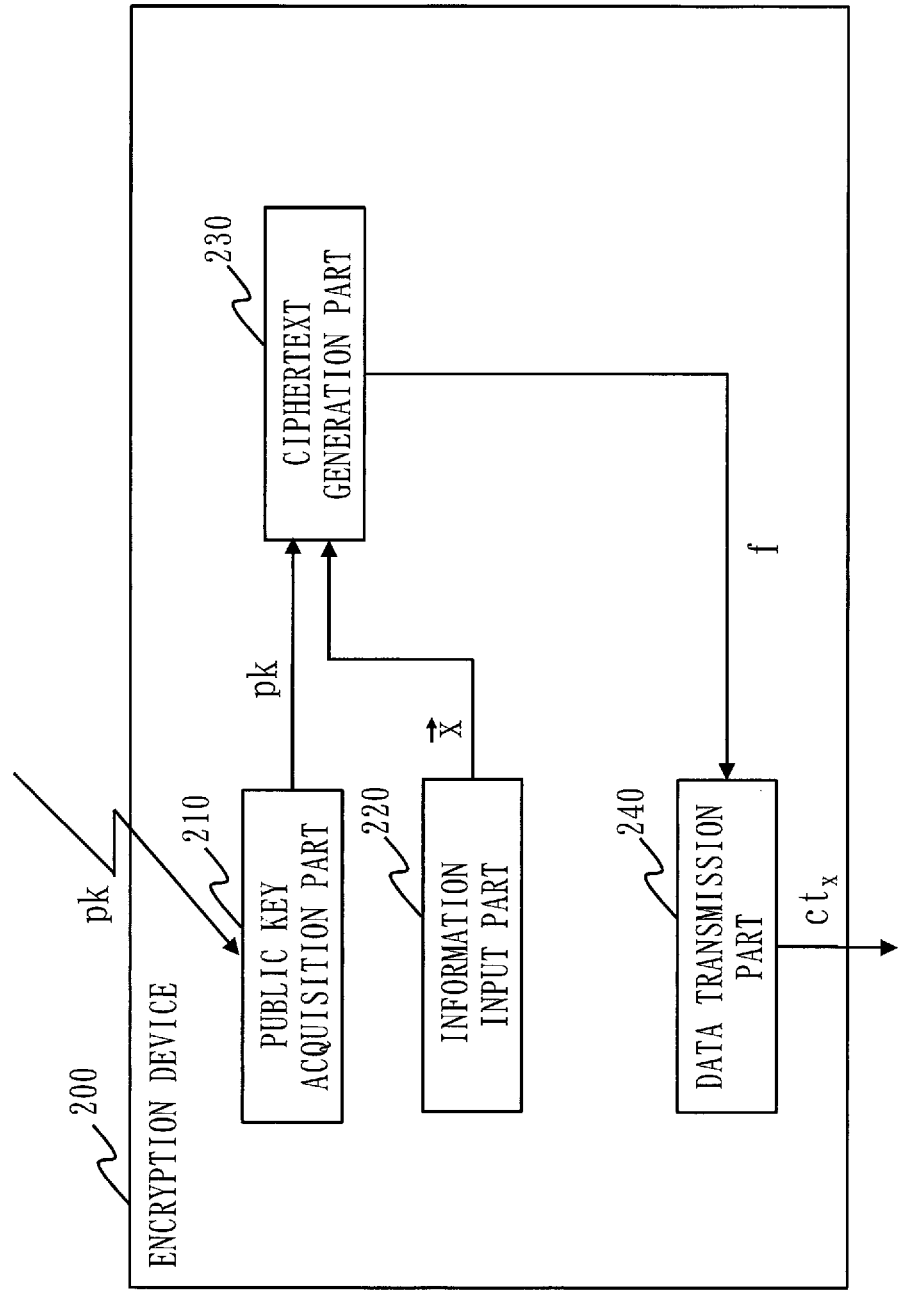
FIG. 3 is a functional block diagram illustrating the function of an encryption device 200 according to Embodiment 1.
Figure 4:
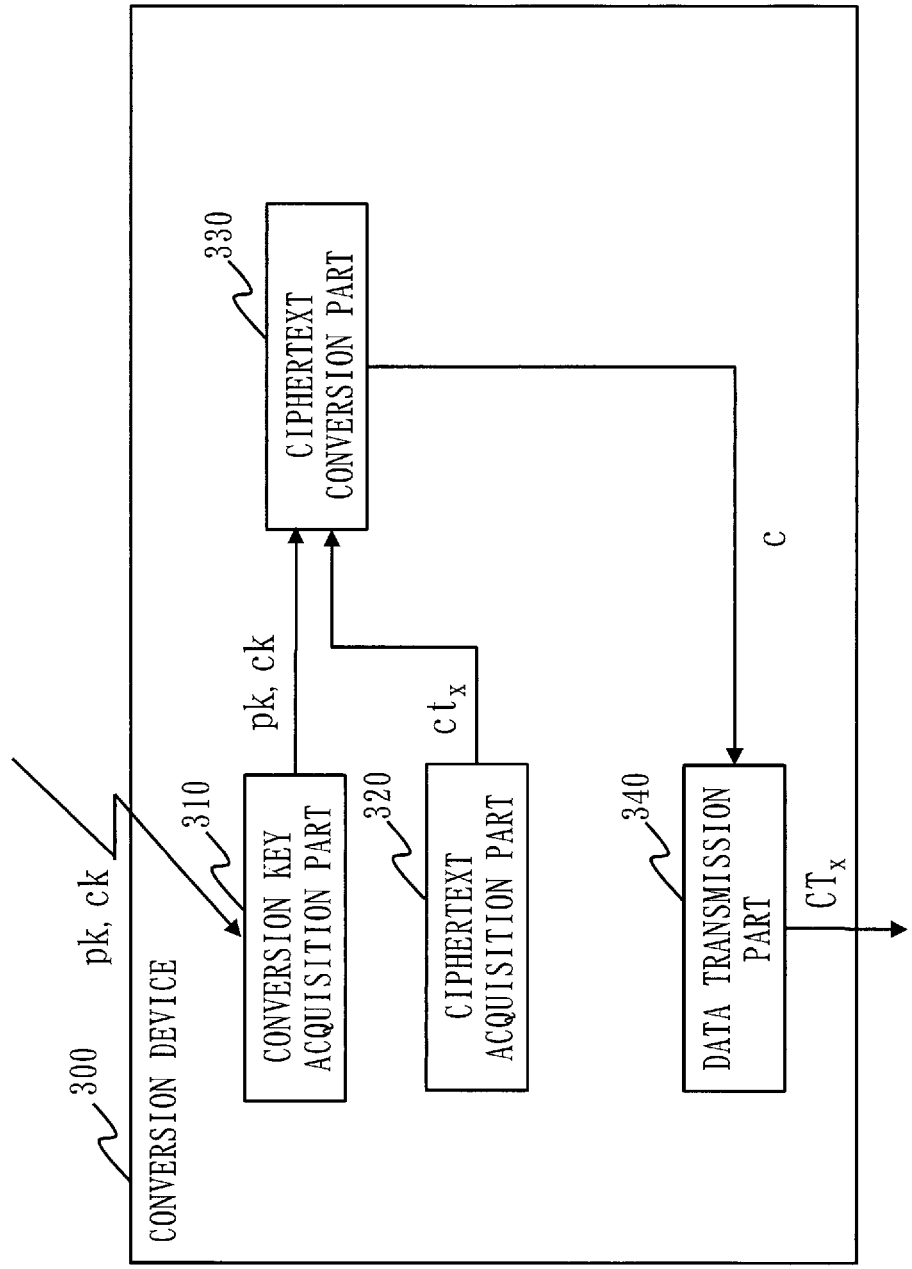
FIG. 4 is a functional block diagram illustrating the function of a conversion device 300 according to Embodiment 1.
Figure 5:
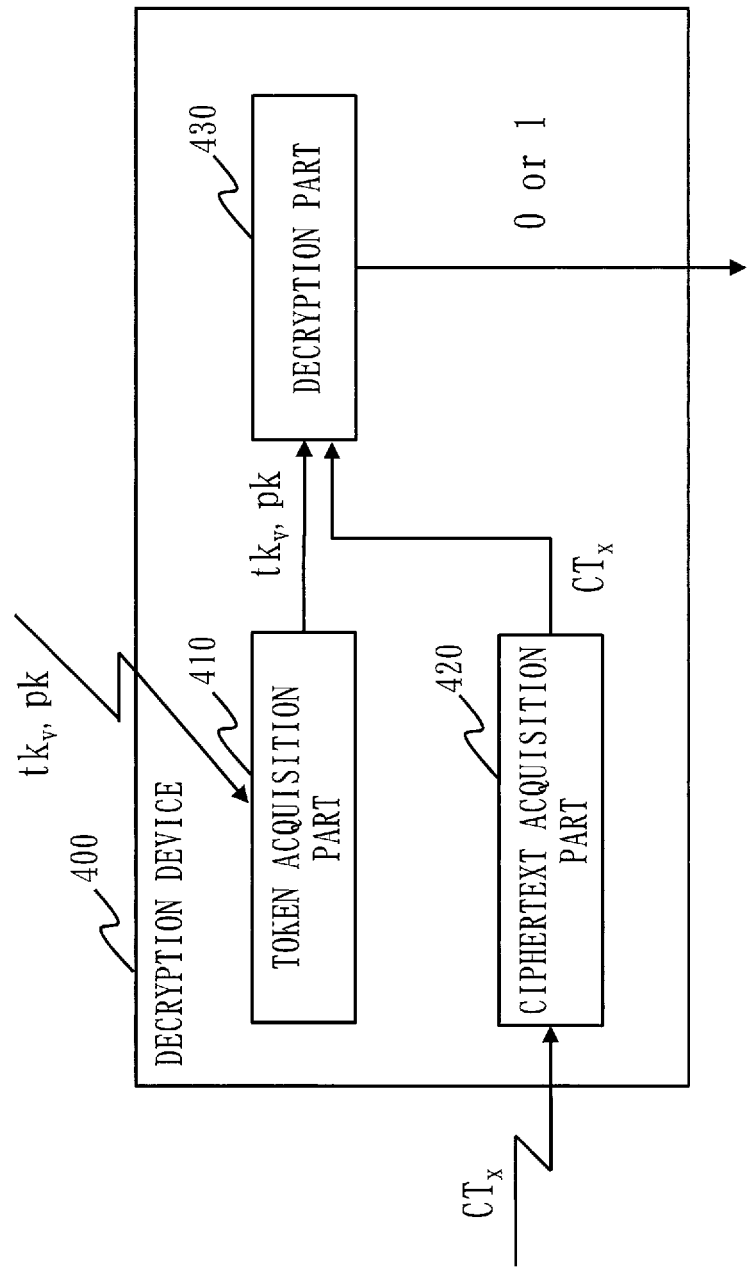
FIG. 5 is a functional block diagram illustrating the function of a decryption device 400 according to Embodiment 1.

FIG. 2 is a functional block diagram illustrating the function of the key generation device 100 according to Embodiment 1. FIG. 3 is a functional block diagram illustrating the function of the encryption device 200 according to Embodiment 1. FIG. 4 is a functional block diagram illustrating the function of the conversion device 300 according to Embodiment 1. FIG. 5 is a functional block diagram illustrating the function of the decryption device 400 according to Embodiment 1.

Figure 6:
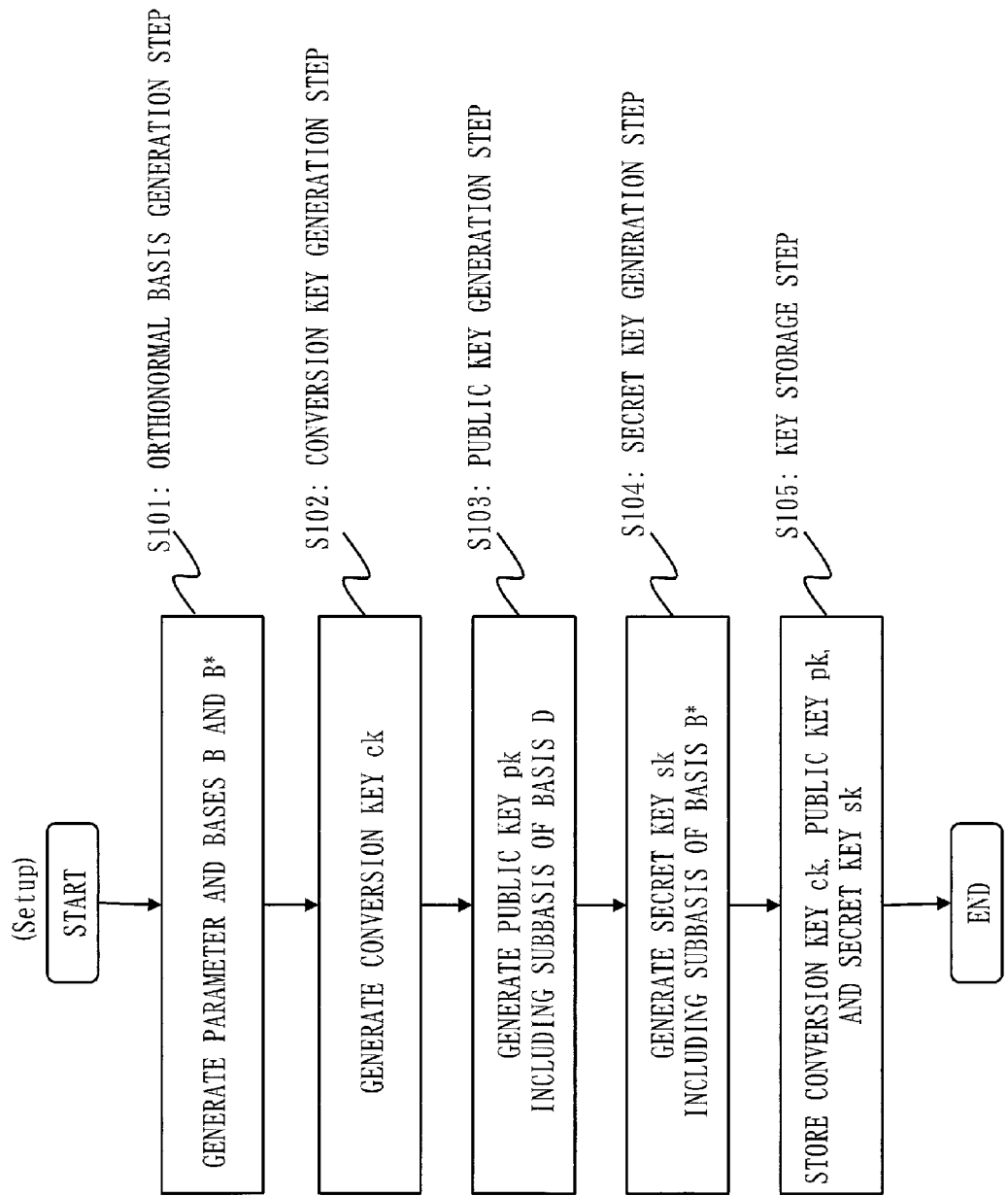
FIG. 6 is a flowchart illustrating the process of a Setup algorithm according to Embodiment 1.
Figure 7:
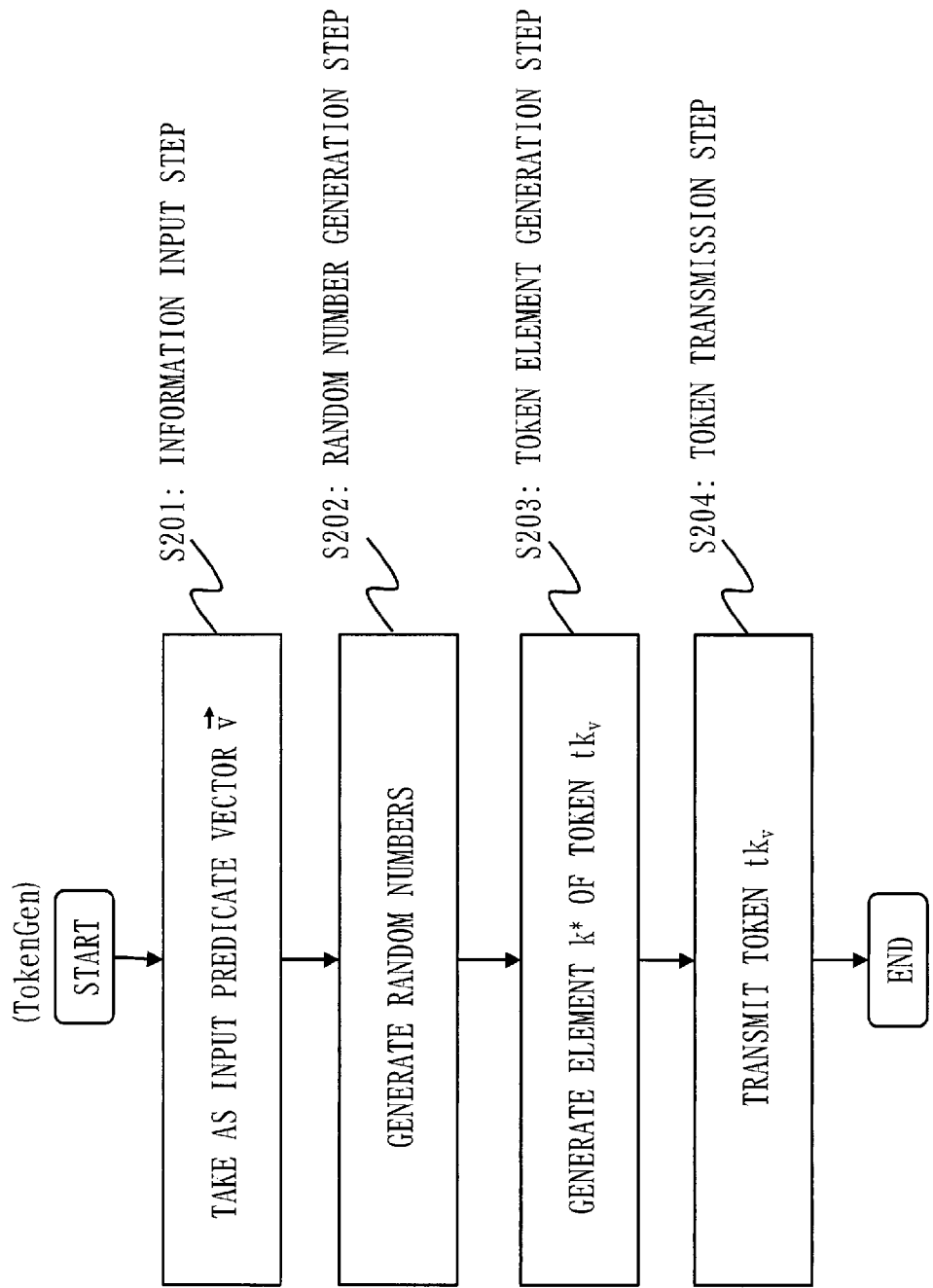
FIG. 7 is a flowchart illustrating the process of a Token-Gen algorithm according to Embodiment 1.
Figure 8:
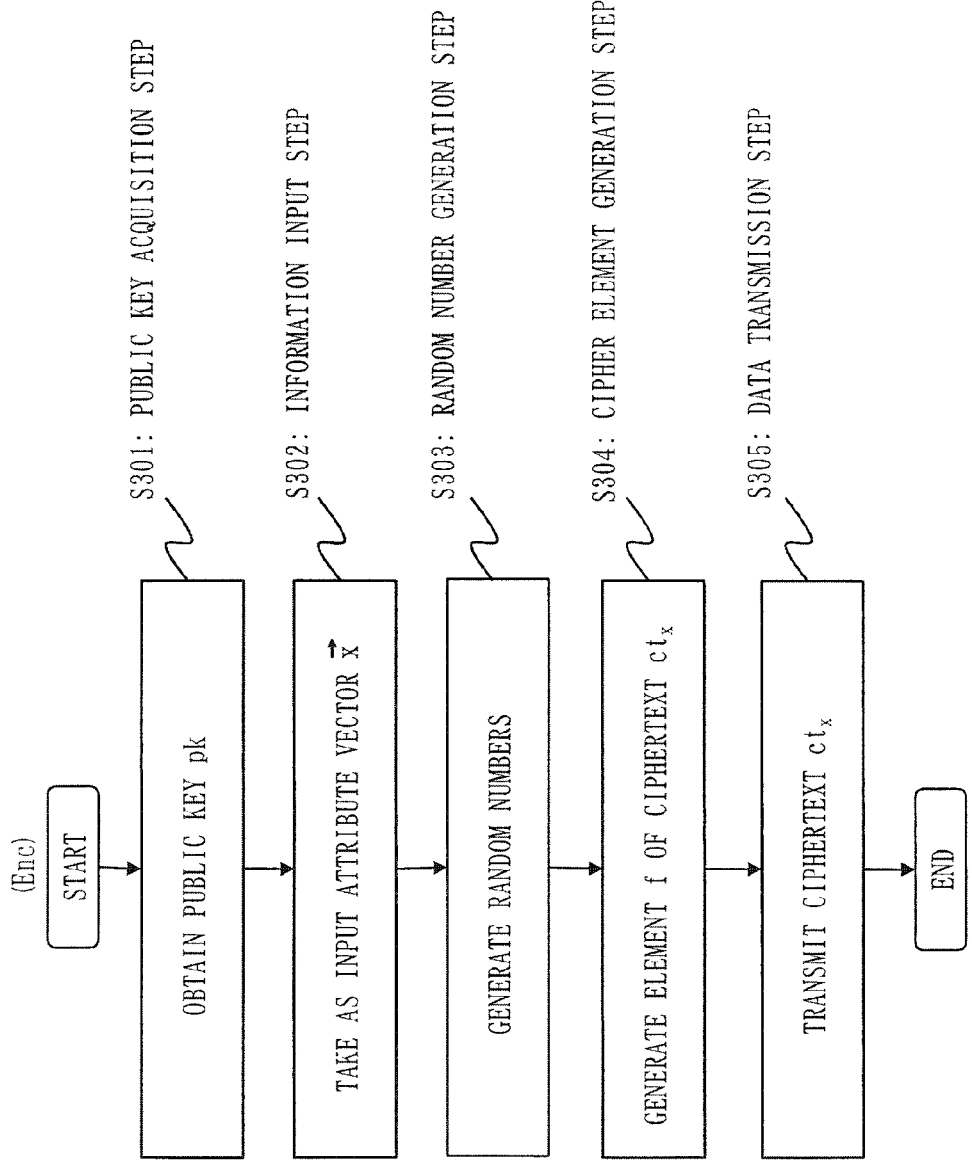
FIG. 8 is a flowchart illustrating the process of an Enc algorithm according to Embodiment 1.
Figure 9:
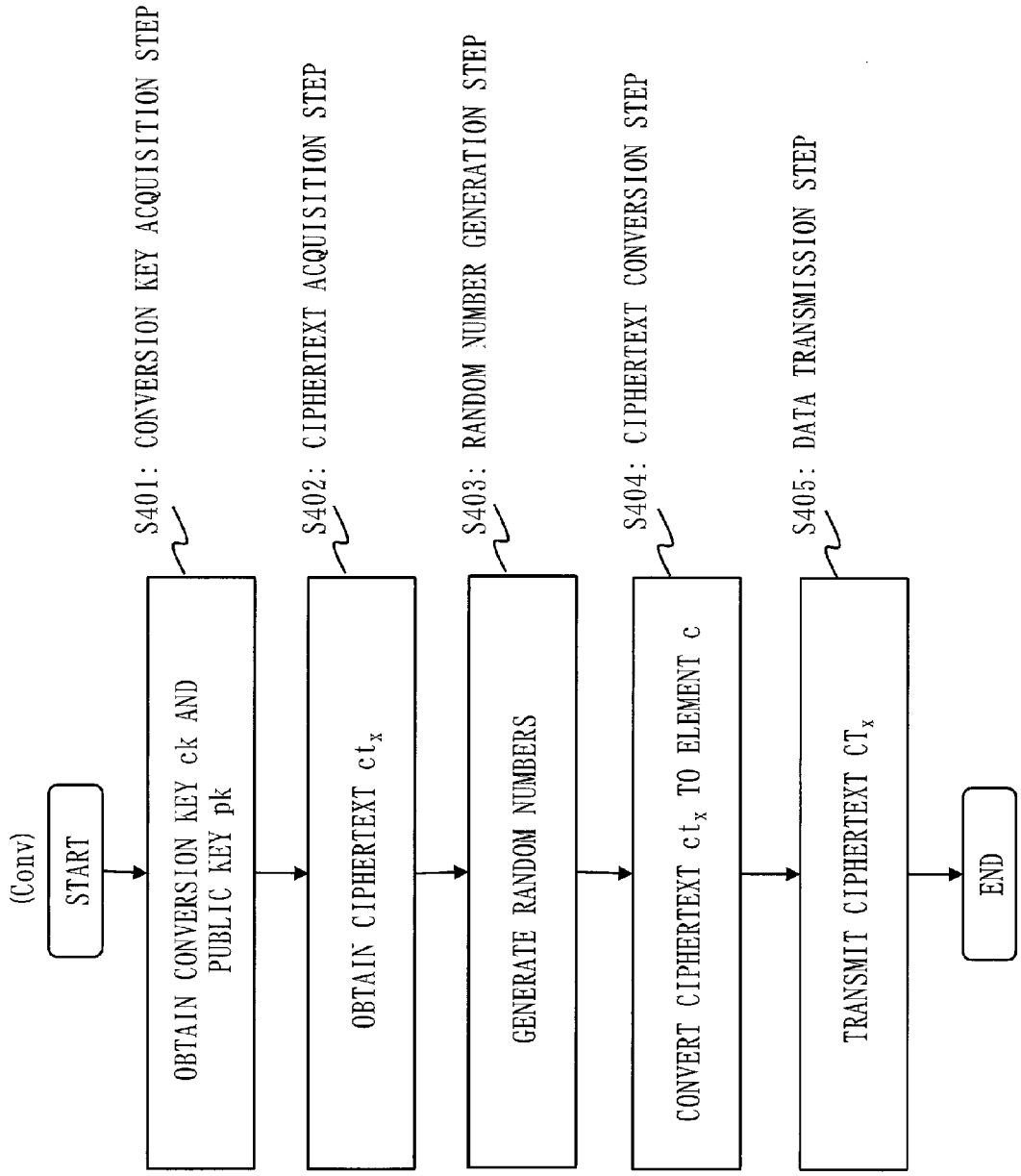
FIG. 9 is a flowchart illustrating the process of a Conv algorithm according to Embodiment 1.
Figure 10:
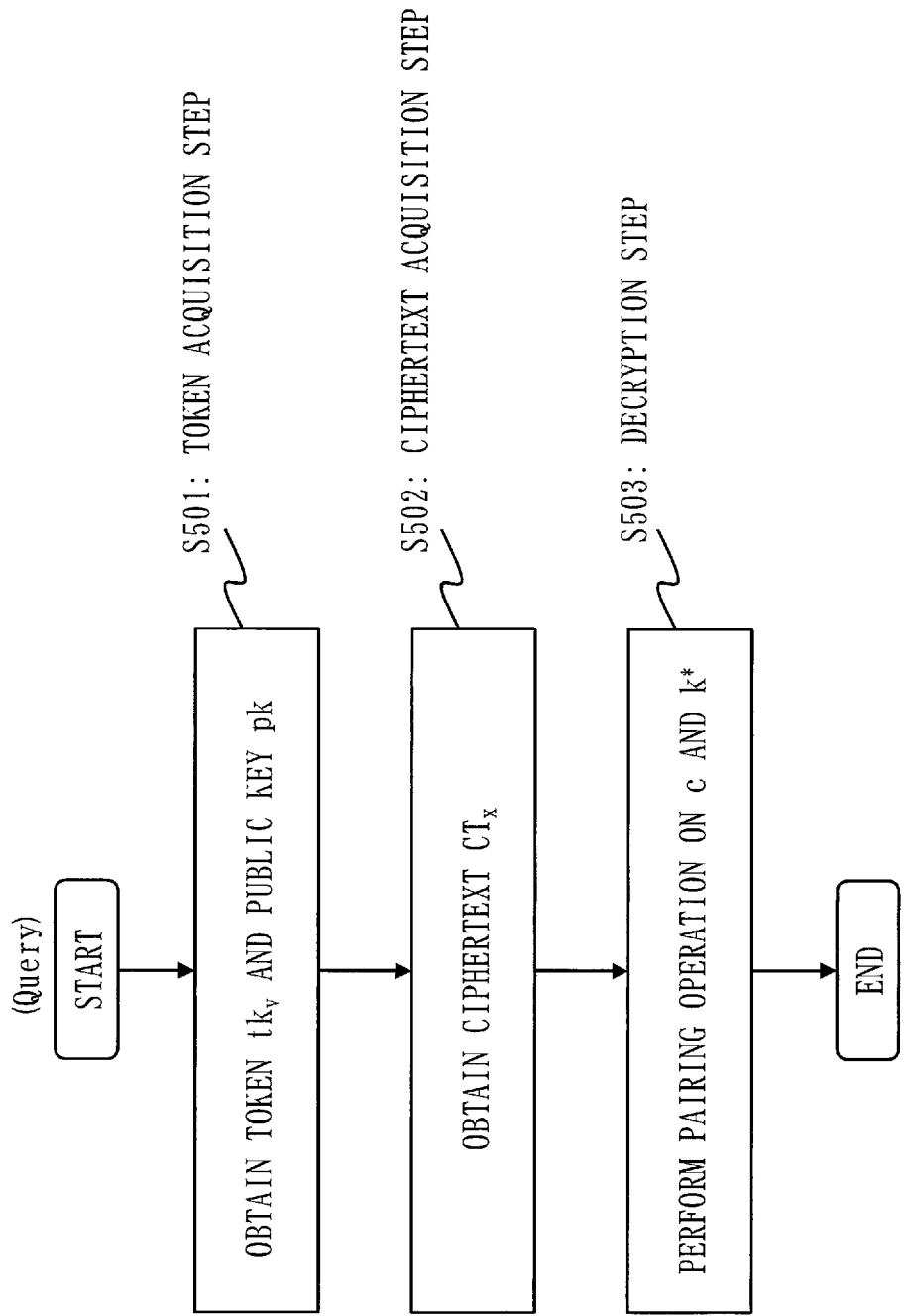
FIG. 10 is a flowchart illustrating the process of a Query algorithm according to Embodiment 1.

FIG. 6 and FIG. 7 are flowcharts illustrating the operation of the key generation device 100 according to Embodiment 1. FIG. 6 is a flowchart illustrating the process of the Setup algorithm according to Embodiment 1, and FIG. 7 is a flowchart illustrating the process of the TokenGen algorithm according to Embodiment 1. FIG. 8 is a flowchart illustrating the operation of the encryption device 200 according to Embodiment 1 and illustrating the process of the Enc algorithm according to Embodiment 1. FIG. 9 is a flowchart illustrating the operation of the conversion device 300 according to Embodiment 1 and illustrating the process of the Conv algorithm according to Embodiment 1. FIG. 10 is a flowchart illustrating the operation of the decryption device 400 according to Embodiment 1 and illustrating the process of the Query algorithm according to Embodiment 1.

The function and operation of the key generation device 100 will be described.

As illustrated in FIG. 2, the key generation device 100 includes a master key generation part 110, a master key storage part 120, an information input part 130, a token generation part 140, and a token transmission part 150.

With reference to FIG. 6, the process of the Setup algorithm will be described.

(S101: Orthonormal Basis Generation Step)

Using a processing device, the master key generation part 110 computes Formula 117, and thus generates a parameter $param_V$, a basis B, and a basis B*.

[Formula 117]

$$\text{input } 1^\lambda \quad (1)$$

$$N := n + u + w + z \quad (2)$$

$$param_\mathbb{G} := (q, \mathbb{G}, \mathbb{G}_T, g, e) \xleftarrow{R} \mathcal{G}_{bpg}(1^\lambda), \quad (3)$$

$$param_{\mathbb{V}'} := (q, \mathbb{V}, \mathbb{G}_T, \mathbb{A}, e) \xleftarrow{R} \mathcal{G}_{dpvs}(1^\lambda, N, param_\mathbb{G})$$

$$\psi \xleftarrow{U} \mathbb{F}_q^\times \quad (4)$$

$$X := (\chi_{i,j}) \xleftarrow{U} GL(N, \mathbb{F}_q) \quad (5)$$

$$(\vartheta_{i,j}) := \psi \cdot (X^T)^{-1} \quad (6)$$

-continued $$b_i := \sum_{j=1}^{N} \chi_{i,j} a_j, \mathbb{B}^* := (b_1, \ldots, b_N) \quad (7)$$

$$b_i^* := \sum_{j=1}^{N} \vartheta_{i,j} a_j, \mathbb{B}^* := (b_1^*, \ldots, b_N^*) \quad (8)$$

$$g_T := e(g, g)^\psi, param_\mathbb{V} = (param_{\mathbb{V}'}, g_T) \quad (9)$$

That is, the master key generation part 110 executes the following process (1) through (9).

(1) Using an input device, the master key generation part 110 takes as input a security parameter $\lambda$.

(2) Using the processing device, the master key generation part 110 sets n+u+w+z in N. Note that n is an integer of 1 or more, and u, w, and z are integers of 0 or more.

(3) Using the processing device, the master key generation part 110 executes the algorithm $\mathcal{G}_{bpg}$ taking as input the security parameter $\lambda$ inputted in (1), and thus generates a parameter $param_G$ of bilinear pairing groups. Then, using the processing device, the master key generation part 110 executes the algorithm $\mathcal{G}_{dpvs}$ taking as input the security parameter $\lambda$ inputted in (1), N set in (2), and the parameter $param_G$, and thus generates values of a parameter $param_{V'}:=(q, V, G_T, A, e)$ of dual pairing vector spaces.

(4) Using the processing device, the master key generation part 110 generates a random number $\psi$.

(5) Using the processing device, the master key generation part 110 takes as input N set in (2) and $\mathbb{F}_q$, and randomly generates a linear transformation $X:=(\chi_{i,j})$. Note that GL stands for general linear. In other words, GL is a general linear group, a set of square matrices with non-zero determinants, and a group under multiplication.

(6) Using the processing device and based on the random number $\psi$ generated in (4) and the linear transformation X generated in (5), the master key generation part 110 generates $(v_{i,j}):=\psi \cdot (X^T)^{-1}$.

(7) Using the processing device and based on the linear transformation X generated in (5), the master key generation part 110 generates a basis B from the canonical basis A generated in (3).

(8) Using the processing device and based on $v_{i,j}$ generated in (6), the master key generation part 110 generates a basis B* from the canonical basis A generated in (3).

(9) Using the processing device, the master key generation part 110 sets $e(g, g)^\psi$ in $g_T$. The master key generation part 110 also sets $param_{V'}$ generated in (3) and $g_T$ in $param_V$.

(S102: Conversion Key Generation Step)

Using the processing device, the master key generation part 110 generates conversion information W, as indicated in Formula 118. The master key generation part 110 designates the conversion information W as a conversion key ck.

[Formula 118]

$$W \xleftarrow{U} GL(N, \mathbb{F}_q)$$

(S103: Public Key Generation Step)

Using the processing device, the master key generation part 110 converts the basis B generated in S101 with the conversion key W, as indicated in Formula 119, and thus generates a basis D. Then, using the processing device, the master key generation part 110 generates a subbasis $\hat{D}$ of the basis D, as indicated in Formula 119.

$$d_i := b_i W \text{ for } i=1, \ldots, n+u+w+z,$$

$$\mathbb{D} := (d_1, \ldots, d_{n+u+w+z}),$$

$$\hat{\mathbb{D}} := (d_1, \ldots, d_n, d_{n+u+w+1}, \ldots, d_{n+u+w+z}) \quad \text{[Formula 119]}$$

The master key generation part 110 designates a combination of the subbasis $\hat{D}$, the security parameter $\lambda$ inputted in S101, and $param_\mathbb{V}$ generated in S101 as a public key pk.

(S104: Secret Key Generation Step)

Using the processing device, the master key generation part 110 generates a subbasis $\hat{B}^*$ of the basis $B^*$ generated in S101, as indicated in Formula 120.

$$\hat{\mathbb{B}}^* := (b^*_1, \ldots, b^*_n, b^*_{n+u+1}, \ldots, b^*_{n+u+w}) \quad \text{[Formula 120]}$$

The master key generation part 110 designates the subbasis $\hat{B}^*$ as a secret key sk.

(S105: Key Storage Step)

The master key storage part 120 stores the conversion key ck generated in S102, the public key pk generated in S103, and the secret key sk generated in S104 in a storage device.

In brief, in S101 through S104, the key generation device 100 generates the conversion key ck, the public key pk, and the secret key sk by executing the Setup algorithm indicated in Formula 121. In S105, the key generation device 100 stores the conversion key ck, the public key pk, and the secret key sk in the storage device.

The public key pk is published, for example, via a network, and is made available for the encryption device 200, the conversion device 300, and the decryption device 400. The conversion key ck is transmitted to the conversion device 300 in secrecy by a communication device and via the network, for example.

[Formula 121]

Setup $(1^\lambda)$:

$(param_\mathbb{V}, \mathbb{B} := (b_1, \ldots, b_{n+u+w+z}),$ $\mathbb{B}^* := (b^*_1, \ldots, b^*_{n+u+w+z})) \xleftarrow{R} \mathcal{G}^{IPE}_{ob}(1^\lambda),$ $W \xleftarrow{U} GL(N, \mathbb{F}_q),$ $d_i := b_i W \text{ for } i = 1, \ldots, n + u + w + z,$ $\mathbb{D} := (d_1, \ldots, d_{n+u+w+z}),$ $\hat{\mathbb{D}} := (d_1, \ldots, d_n, d_{n+u+w+1}, \ldots, d_{n+u+w+z}),$ $\hat{\mathbb{B}}^* := (b^*_1, \ldots, b^*_n, b^*_{n+u+1}, \ldots, b^*_{n+u+w}),$ $\text{return } pk := (1^\lambda, param_\mathbb{V}, \hat{\mathbb{D}}), ck := W, sk := \hat{\mathbb{B}}^*.$ $\mathcal{G}^{IPE}_{ob}(1^\lambda):$ $N := n + u + w + z,$ $param_\mathbb{G} := (q, \mathbb{G}, \mathbb{G}_T, g, e) \xleftarrow{R} \mathcal{G}_{bpg}(1^\lambda),$ $param_{\mathbb{V}'} := (q, \mathbb{V}, \mathbb{G}_T, \mathbb{A}, e) \xleftarrow{R} \mathcal{G}_{dpvs}(1^\lambda, N),$ $\psi \xleftarrow{U} \mathbb{F}^\times_q, g_T := e(g, g)^\psi,$ $X := (\chi_{i,j}) \xleftarrow{U} GL(N, \mathbb{F}_q), (\vartheta_{i,j}) := \psi \cdot (X^T)^{-1},$ $param_\mathbb{V} := (param_{\mathbb{V}'}, g_T),$ $b_i := \sum_{j=1}^{N} \chi_{i,j} a_j, \mathbb{B} := (b_1, \ldots, b_N),$ $b^*_i := \sum_{j=1}^{N} \vartheta_{i,j} a_j, \mathbb{B}^* := (b^*_1, \ldots, b^*_N),$ $\text{return } (param_\mathbb{V}, \mathbb{B}, \mathbb{B}^*).$ With reference to FIG. 7, the process of the TokenGen algorithm will be described.

(S201: Information Input Step)

Using the input device, the information input part 130 takes as input a predicate vector $\vec{v}$. In the predicate vector $\vec{v}$, attribute information of a user of a token $tk_v$, a search keyword, and so on are set as elements, for example.

(S202: Random Number Generation Step)

Using the processing device, the token generation part 140 generates random numbers, as indicated in Formula 122.

[Formula 122]

$\sigma \xleftarrow{U} \mathbb{F}_q,$ $\vec{\eta} := (\eta_1, \ldots, \eta_w) \xleftarrow{U} \mathbb{F}^w_q$ (S203: Token Element Generation Step)

Using the processing device, the token generation part 140 generates an element $k^*$ of the token $tk_v$, as indicated in Formula 123.

[Formula 123]

$$k* := \left( \overbrace{\sigma \vec{v}}^{n}, \overbrace{0^u}^{u}, \overbrace{\vec{\eta}}^{w}, \overbrace{0^z}^{z} \right)_{\mathbb{B}^*}$$

For the basis B and the basis $B^*$ indicated in Formula 110, Formula 111 is defined. Thus, Formula 123 means that $\sigma v_1, \ldots, \sigma v_n$ are respectively set as the coefficient of basis vectors $b^*_1, \ldots, b^*_n$ of the basis $B^*$, 0 is set as the coefficient of each of basis vectors $b^*_{n+1}, \ldots, b^*_{n+u}$ of the basis $B^*$, $\eta_1, \ldots, \eta_w$ are respectively set as the coefficient of basis vectors $b^*_{n+u+1}, \ldots, b^*_{n+u+w}$ of the basis $B^*$, and 0 is set as the coefficient of each of basis vectors $b^*_{n+u+w+1}, \ldots, b^*_{n+u+w+z}$ of the basis $B^*$.

(S204: Token Transmission Step)

Using the communication device and via the network, for example, the token transmission part 150 transmits the token $tk_v$ having the element $k^*$ generated in S203 to the decryption device 400 in secrecy. As a matter of course, the token $tk_v$ may be transmitted to the decryption device 400 by another method.

In brief, in S201 through S203, the key generation device 100 generates the token $tk_v$ by executing the TokenGen algorithm indicated in Formula 124. In S204, the key generation device 100 transmits the token $tk_v$ to the decryption device 400.

[Formula 124]

$\text{TokenGen}(pk, sk, \vec{v} \in \mathbb{F}^n_q \setminus \{\vec{0}\}):$ $\sigma \xleftarrow{U} \mathbb{F}_q, \vec{\eta} := (\eta_1, \ldots, \eta_w) \xleftarrow{U} \mathbb{F}^w_q,$ -continued $$k^* := \left(\frac{n}{\sigma \vec{v}}, \frac{u}{0^u}, \frac{w}{\eta}, \frac{z}{0^z}\right)_{\mathbb{B}^*},$$

return $tk_v := k^*$.

The function and operation of the encryption device 200 will be described.

As illustrated in FIG. 3, the encryption device 200 includes a public key acquisition part 210, an information input part 220, a ciphertext generation part 230, and a data transmission part 240.

With reference to FIG. 8, the process of the Enc algorithm will be described.

(S301: Public Key Acquisition Step)

Using the communication device and via the network, for example, the public key acquisition part 210 obtains the public key pk generated by the key generation device 100.

(S302: Information Input Step)

Using the input device, the information input part 220 takes as input an attribute vector $\vec{x} \in \mathbb{F}_q$. In the attribute vector $\vec{x}$, attribute information of a user who is allowed to search and a search tag are set as elements, for example.

(S303: Random Number Generation Step)

Using the processing device, the ciphertext generation part 230 generates random numbers as indicated in Formula 125.

[Formula 125]

$$\tau \xleftarrow{\text{U}} \mathbb{F}_q, \vec{\xi} := (\xi_1, \ldots, \xi_z) \xleftarrow{\text{U}} \mathbb{F}_q^z$$

(S304: Cipher Element Generation Step)

Using the processing device, the ciphertext generation part 230 generates an element f of a ciphertext $ct_x$, as indicated in Formula 126.

[Formula 126]

$$f := \left(\frac{n}{\tau \vec{x}}, \frac{u}{0^u}, \frac{w}{0^w}, \frac{z}{\vec{\xi}}\right)_{\mathbb{D}}$$

(S305: Data Transmission Step)

Using the communication device and via the network, for example, the data transmission part 240 transmits the ciphertext $ct_x$ including the element f generated in S304 to the conversion device 300. As a matter of course, the ciphertext $ct_x$ may be transmitted to the conversion device 300 by another method.

In brief, in S301 through S304, the encryption device 200 generates the ciphertext $ct_x$ by executing the Enc algorithm indicated in Formula 127. In S305, the encryption device 200 transmits the ciphertext $ct_x$ to the conversion device 300.

[Formula 127]

$Enc(\text{pk}, \vec{x} \in \mathbb{F}_q^n)$:

$$\tau \xleftarrow{\text{U}} \mathbb{F}_q, \vec{\xi} := (\xi_1, \ldots, \xi_z) \xleftarrow{\text{U}} \mathbb{F}_q^z,$$

$$f := \left(\frac{n}{\tau \vec{x}}, \frac{u}{0^u}, \frac{w}{0^w}, \frac{z}{\vec{\xi}}\right)_{\mathbb{D}},$$

return $ct_x := f$.

The function and operation of the conversion device 300 will be described.

As illustrated in FIG. 4, the conversion device 300 includes a conversion key acquisition part 310, a ciphertext acquisition part 320, a ciphertext conversion part 330, and a data transmission part 340.

With reference to FIG. 9, the process of the Conv algorithm will be described.

(S401: Conversion Key Acquisition Step)

Using the communication device and via the network, for example, the conversion key acquisition part 310 obtains the conversion key ck:=W transmitted by the key generation device 100. The conversion key acquisition part 310 also obtains the public key pk generated by the key generation device 100.

(S402: Ciphertext Acquisition Step)

Using the communication device and via the network, for example, the ciphertext acquisition part 320 receives the ciphertext $ct_x := f$ transmitted by the encryption device 200.

(S403: Random Number Generation Step)

Using the processing device, the ciphertext conversion part 330 generates random numbers as indicated in Formula 128.

[Formula 128]

$$\rho \xleftarrow{\text{U}} \mathbb{F}_q,$$

$$y \xleftarrow{\text{U}} \text{span}\langle d_{n+u+w+1}, \ldots, d_{n+u+w+z}\rangle$$

(S404: Ciphertext Conversion Step)

Using the processing device, the ciphertext conversion part 330 converts the ciphertext $ct_x$, as indicated in Formula 129, and thus generates an element c.

$$c := (\rho f + y) W^{-1} \qquad \text{[Formula 129]}$$

(S405: Data Transmission Step)

Using the communication device and via the network, for example, the data transmission part 340 transmits a ciphertext $CT_x$ including the element c generated in S404 to the decryption device 400. As a matter of course, the ciphertext $CT_x$ may be transmitted to the decryption device 400 by another method.

In brief, in S401 through S404, the conversion device 300 generates the ciphertext $CT_x$ by executing the Conv algorithm indicated in Formula 130. In S405, the conversion device 300 transmits the generated ciphertext $CT_x$ to the decryption device 400.

[Formula 130]

$Conv(\text{pk}, ck := W, ct_x := f)$:

$$\rho \xleftarrow{\text{U}} \mathbb{F}_q, y \xleftarrow{\text{U}} \text{span}\langle d_{n+u+w+1}, \ldots, d_{n+u+w+z}\rangle,$$

$$c := (\rho f + y) W^{-1},$$

return $CT_x := c$.

The function and operation of the decryption device 400 will be described.

As illustrated in FIG. 5, the decryption device 400 includes a token acquisition part 410, a ciphertext acquisition part 420, and a decryption part 430.

With reference to FIG. 10, the process of the Dec algorithm will be described.

(S501: Token Acquisition Step)

Using the communication device and via the network, for example, the token acquisition part 410 obtains the token $tk_v := k^*$ transmitted by the key generation device 100. The token acquisition part 410 also obtains the public key pk generated by the key generation device 100.

(S502: Ciphertext Acquisition Step)

Using the communication device and via the network, for example, the ciphertext acquisition part 420 receives the ciphertext $CT_x := c$ transmitted by the conversion device 300.

(S503: Decryption Step)

Using the processing device, the decryption part 430 outputs 1 indicating that decryption has been successful if a result of computing a pairing operation $e(c, k^*)$ is 1, and outputs 0 indicating that decryption has failed if the result is not 1.

In brief, in S501 through S503, the decryption device 400 executes the Query algorithm indicated in Formula 131, and thus determines whether or not decryption has been successful.

Query($pk, tk_v := k^*, CT_x := c$):  [Formula 131]

if $e(c,k^*)=1$, output 1, otherwise, output 0.

Note that $D \cdot W^{-1} := d_1 W^{-1}, \ldots, d_{n+u+w+z} W^{-1}$) is equal to $B := (b_1, \ldots, b_{n+u+w+z})$. Thus, $c := (\rho f + y) W^{-1} = (\omega \vec{x}, 0^u, 0^w, \vec{\eta})_D \cdot W^{-1} = (\omega \vec{x}, 0^u, 0^w, \vec{\eta})_{D \cdot W^{-1}} = (\omega \vec{x}, 0^u, 0^w, \vec{\eta})_B$, where the subscript W−1 means $W^{-1}$. $\omega \in F_q$ and $\vec{\eta} \in F^n_q$ are uniformly and independently distributed. Thus, if $\vec{v} \cdot \vec{x}=0$, then $e(c, k^*) = g_T^{\omega \sigma \vec{v} \cdot \vec{x}} = 1$.

In the conventional IPE, a ciphertext can be freely generated using the public key pk. Thus, there is a risk that information on the predicate vector $\vec{v}$ which is set in the token $tk_v$ may be leaked by executing the Query algorithm on a large number of ciphertexts.

In the IPE-CC scheme according to Embodiment 1, the conversion device 300 converts the basis of the ciphertext $ct_x$ using the conversion key ck to generate the ciphertext $CT_x$, and the decryption device 400 executes the Query algorithm on the converted ciphertext $CT_x$. Therefore, the Query algorithm cannot be executed on a large number of ciphertexts without help from the conversion device 300. With this arrangement, the leakage of the information on the predicate vector $\vec{v}$ which is set in the token $tk_v$ can be prevented.

It has been described in the above that a combination of the basis D̂, the security parameter λ, and $param_V$ is published as the public key pk.

However, the basis D̂, the security parameter λ, and $param_V$ may be transmitted to the encryption device 200 in secrecy as another secret key which is paired with the secret key sk, instead of being used as the public key. In this case, inner-product predicate encryption which can conceal both the attribute information and the predicate information in the secret key setting can be implemented.

It has been described in the above that u, w, and z are integers of 0 or more. It may be arranged that u=3n, w=n, and z=n, for example.

In the above, the method for determining whether or not the ciphertext $ct_x$ satisfies the condition which is set in the token $tk_v$ has been described. With this method, a secure search system can be constructed in which the ciphertext $ct_x$ can be searched for while remaining encrypted.

However, as discussed in Non-Patent Literature 2 and so on, by embedding a message m in a ciphertext $ct_x$, a narrowly-defined cryptographic system can be constructed in which the message m embedded in the ciphertext $ct_x$ is retrieved with the token $tk_v$.

Embodiment 2

Embodiment 2 describes an IPE-CC scheme in which efficiency is improved by employing a sparse matrix for generating orthonormal bases B and B*.

In Embodiment 2, what is the same as in Embodiment 1 will not be described, and differences from Embodiment 1 will be mainly described.

The configurations of the key generation device 100, the encryption device 200, the conversion device 300, and the decryption device 400 according to Embodiment 2 are respectively the same as the configurations of these devices illustrated in FIG. 2 to FIG. 5.

The flows of the Setup algorithm, the TokenGen algorithm, the Enc algorithm, the Conv algorithm, and the Query algorithm according to Embodiment 2 are respectively the same as the flows of these algorithms illustrated in FIG. 6 to FIG. 10.

A sparse matrix employed in Embodiment 2 will be described, and a linear transformation X constructed using the sparse matrix and an adjoint matrix $\psi(X^{-1})^T$ of the linear transformation X will be described.

It is assumed that N:=6n, that $H(n, F_q)$ is as indicated in Formula 132, and that $L(6, n, F_q)$ is as indicated in Formula 133.

[Formula 132]

$$\mathcal{H}(n, F_q) := \left\{ \begin{pmatrix} \mu''_1 & \mu''_2 & \cdots & \mu''_{n-1} & \mu'' \\ \mu & & & & \mu'_2 \\ & \ddots & & & \vdots \\ & & & \mu & \mu'_{n-1} \\ & & & & \mu'_n \end{pmatrix} \middle| \begin{array}{l} \mu, \mu'_2, \ldots, \mu'_n, \\ \mu''_1, \ldots, \mu''_{n-1}, \mu''' \in F_q \\ \text{a blank element in the matrix} \\ \text{denotes } 0 \in F_q \end{array} \right\}$$

[Formula 133]

$$\mathcal{L}(6, n, F_q) := \left\{ X := \begin{pmatrix} X_{1,1} & \cdots & X_{1,6} \\ \vdots & & \vdots \\ X_{6,1} & \cdots & X_{6,6} \end{pmatrix} \middle| \begin{array}{l} X_{i,j} \in \mathcal{H}(n, F_q) \\ \text{for } i, j = 1, \ldots, 6 \end{array} \right\} \cap GL(N, F_q)$$

Note that $L(6, n, F_q)$ is a subset of $GL(N, F_q)$.

The adjoint matrix $\psi(X^{-1})^T$ of the linear transformation $X \in L(6, n, F_q)$ is represented in a sparse form indicated in Formula 134.

[Formula 134]

$$\psi(X^{-1})^T := \begin{pmatrix} Y_{1,1} & \cdots & Y_{1,6} \\ \vdots & & \vdots \\ Y_{6,1} & \cdots & Y_{6,6} \end{pmatrix}$$

-continued $$\text{where } Y_{i,j} := \begin{pmatrix} v''_{i,j,1} & & & \\ v''_{i,j,2} & v_{i,j} & & \\ \vdots & & \ddots & \\ v''_{i,j,n-1} & & & v_{i,j} \\ v'''_{i,j} & v'_{i,j,2} & \cdots & v'_{i,j,n} \end{pmatrix} \quad i, j = 1, \ldots, 6$$

Here, a blank element in matrices X and $(X^{-1})^T$ denotes a constant value $0 \in F_q$. The constant value 0 signifies that the value is fixed to 0.

That is, the matrix $X \in L(6, n, F_q)$ is represented by 72n non-zero elements $\{u_{i,j}, u'_{i,j,2}, \ldots, u'_{i,j,n}, u''_{i,j,1}, \ldots, u''_{i,j,n-1}, u'''_{i,j}\}_{i,j=1,\ldots,6}$, and the adjoint matrix $\psi \cdot (X^{-1})^T$ is represented by 72n non-zero elements $\{v_{i,j}, v'_{i,j,2}, \ldots, v'_{i,j,n}, v''_{i,j,1}, \ldots, v''_{i,j,n-1}, v'''_{i,j}\}_{i,j=1,\ldots,6}$. Note that a non-zero element is a uniform random number which may be 0.

The IPE-CC scheme according to Embodiment 2 will be described.

Here, it is assumed that $x_1 \ne 0$ and $v_1 \ne 0$ for an attribute vector $\vec{x} := (x_1, \ldots, fx_n)$ and a predicate vector $\vec{v} := (v_1, \ldots, v_n)$ which are inputted.

With reference to FIG. 6, the process of the Setup algorithm will be described.

(S101: Orthonormal Basis Generation Step)

Using the processing device, the master key generation part 110 computes Formula 135, and thus generates a parameter $param_V$, a basis B, and a basis B*.

[Formula 135]

$$\text{input } 1^\lambda \quad (1)$$

$$N := 6n \quad (2)$$

$$param_\mathbb{G} := (q, \mathbb{G}, \mathbb{G}_T, g, e) \xleftarrow{R} \mathcal{G}_{bpg}(1^\lambda), \quad (3)$$

$$param_{\mathbb{V}'} := (q, \mathbb{V}, \mathbb{G}_T, \mathbb{A}, e) \xleftarrow{R} \mathcal{G}_{dpvs}(1^\lambda, N, param_\mathbb{G})$$

$$\psi \xleftarrow{U} \mathbb{F}_q^\times \quad (4)$$

$$X \xleftarrow{U} \mathcal{L}(6, n, \mathbb{F}_q) \quad (5)$$

$$(\vartheta_{i,j}) := \psi \cdot (X^{-1})^T \quad (6)$$

$$\{B_{i,j} := \mu_{i,j}g, B'_{i,j,2} := \mu'_{i,j,2}g, \ldots, B'_{i,j,n} := \mu'_{i,j,n}g, \quad (7)$$
$$B''_{i,j,1} := \mu''_{i,j,1}g, \ldots, B''_{i,j,n-1} := \mu''_{i,j,n-1}g, B'''_{i,j} := \mu'''_{i,j}g\}_{i,j=1,\ldots,6}$$

$$\{B^*_{i,j} := v_{i,j}g, B'^*_{i,j,2} := v'_{i,j,2}g, \ldots, B'^*_{i,j,n} := v'_{i,j,n}g, \quad (8)$$
$$B''^*_{i,j,1} := v''_{i,j,1}g, \ldots, B''^*_{i,j,n-1} := v''_{i,j,n-1}g, B'''^*_{i,j} := v'''_{i,j} := g\}_{i,j=1,\ldots,6}$$

$$param_\mathbb{V} := (param_{\mathbb{V}'}, g_T) \quad (9)$$

That is, the master key generation part 110 executes the following process (1) through (9).

(1), (3), (4), and (9) are the same as those in Embodiment 1, and thus will not be described.

(2) Using the processing device, the master key generation part 110 sets 6n in N. Note that n is an integer of 1 or more.

(5) Using the processing device, the master key generation part 110 takes as input n of N:=6n set in (2) and $F_q$, and randomly generates a linear transformation $X := (\chi_{i,j})$.

(6) Using the processing device, the master key generation part 110 generates $(v_{i,j}) := \psi \cdot (X^{-1})^T$ based on the random number $\psi$ generated in (4) and the linear transformation X generated in (5).

In the following, $\{u_{i,j}, u'_{i,j,2}, \ldots, u'_{i,j,n}, u''_{i,j,1}, \ldots, u''_{i,j,n-1}, u'''_{i,j}\}_{i,j=1,\ldots,6}$ denotes non-zero elements in the linear transformation X. $\{v_{i,j}, v'_{i,j,2}, \ldots, v'_{i,j,n}, v''_{i,j,1}, \ldots, v''_{i,j,n-1}, v'''_{i,j}\}_{i,j=1,\ldots,6}$ denotes non-zero elements in the adjoint matrix $\psi \cdot (X^{-1})^T$.

(7) Using the processing device, the master key generation part 110 generates a basis B based on the linear transformation X generated in (5).

(8) Using the processing device, the master key generation part 110 generates a basis B* based on the adjoint matrix $\psi \cdot (X^{-1})^T$ generated in (6).

Here, Formula 136 holds, and note that the basis $B := (b_1, \ldots, b_{6n})$ and the basis $B^* := (b^*_1, \ldots, b^*_{6n})$. Note that a blank element in the matrix denotes the constant element $0 \in G$, and that the bases B and B* are orthonormal bases. That is, for $1 \le i \ne j \le 6n$, $e(b_i, b^*_i) = g_T$ and $e(b_i, b^*_j) = 1$.

[Formula 136]

$$\begin{pmatrix} b_{(i-1)n+1} \\ \vdots \\ \vdots \\ b_{in} \end{pmatrix} :=$$

$$\begin{pmatrix} B''_{i,1,1} & B''_{i,1,2} & \cdots & B''_{i,1,n-1} & B'''_{i,1} & & B''_{i,6,1} & B''_{i,6,2} & \cdots & B''_{i,6,n-1} & B'''_{i,6} \\ B_{i,1} & & & & B'_{i,1,2} & & B_{i,6} & & & & B'_{i,6,2} \\ & \ddots & & & \vdots & \cdots & & \ddots & & & \vdots \\ & & B_{i,1} & B'_{i,1,n-1} & & & & & B_{i,6} & B'_{i,6,n-1} \\ & & & B'_{i,1,n} & & & & & & B'_{i,6,n} \end{pmatrix},$$

-continued $$\begin{pmatrix} b^*_{(i-1)n+1} \\ \vdots \\ \vdots \\ b^*_{in} \end{pmatrix} :=$$

$$\begin{pmatrix} B'''^*_{i,1,1} & & & & & B'''^*_{i,6,1} & & & \\ B'''^*_{i,1,2} & B^*_{i,1} & & & & B'''^*_{i,6,2} & B^*_{i,6} & & \\ \vdots & & \ddots & & & \vdots & & \ddots & \\ B'''^*_{i,1,n-1} & & & B^*_{i,1} & & B'''^*_{i,6,n-1} & & & B^*_{i,6} \\ B''''^*_{i,1} & B'^*_{i,1,2} & \ldots & B'^*_{i,1,n-1} & B'^*_{i,1,n} & B''''^*_{i,6} & B'^*_{i,6,2} & \ldots & B'^*_{i,6,n-1} & B'^*_{i,6,n} \end{pmatrix}$$

(S102: Conversion Key Generation Step)
Using the processing device, the master key generation part 110 generates conversion information W, as indicated in Formula 137. The master key generation part 110 designates the conversion information W as a conversion key ck.

[Formula 137]

$$W \xleftarrow{U} \mathcal{L}(6, n, \mathbb{F}_q)$$

(S103: Public Key Generation Step)
Using the processing device, the master key generation part 110 converts the basis B generated in S101 with the conversion information W, as indicated in Formula 138, and thus generates a basis D:=(d_1, ..., d_{6n}). Then, using the processing device, the master key generation part 110 generates a subbasis D^ of the basis D, as indicated in Formula 138. Here, like the basis B indicated in Formula 136, the basis D is constructed with {$D_{i,j}$, $D'_{i,j,2}$, ..., $D'_{i,j,n}$, $D''_{i,j,1}$, ..., $D''_{i,j,n-1}$, $D'''_{i,j}$}$_{i,j=1, \ldots, 6}$.

[Formula 138]

$$\mathbb{D} := \begin{pmatrix} d_1 \\ \vdots \\ d_{6n} \end{pmatrix} := \begin{pmatrix} b_1 \\ \vdots \\ b_{6n} \end{pmatrix} \cdot W,$$

using $$\{D_{i,j}, D'_{i,j,2}, \ldots, D'_{i,j,n}, D''_{i,j,1}, \ldots, D''_{i,j,n-1}, D'''_{i,j}\}_{i,j=1,\ldots,6},$$

$$\hat{\mathbb{D}} := \{D_{i,j}, D'_{i,j,2}, \ldots, D'_{i,j,n}, D''_{i,j,1}, \ldots, D''_{i,j,n-1}, D'''_{i,j}\}_{i=1,6;j=1,\ldots,6}$$

The master key generation part 110 designates a combination of the generated subbasis D^, the security parameter λ inputted in S101, and param_v generated in S101 as a public key pk.

(S104: Secret Key Generation Step)
Using the processing device, the master key generation part 110 generates a subbasis B*^ of the basis B* generated in S101, as indicated in Formula 139.

$$\hat{\mathbb{B}}^* := \{B^*_{i,j}, B'^*_{i,j,2}, \ldots, B'^*_{i,j,n}, B''^*_{i,j,1}, \ldots, B''^*_{i,j,n-1}, B'''^*_{i,j}\}_{i=1,5;j=1,\ldots,6}$$

[Formula 139]

The master key generation part 110 designates the generated subbasis B*^ as a secret key sk.

(S105: Key Storage Step)
The master key storage part 120 stores the conversion key ck generated in S102, the public key pk generated in S103, and the secret key sk generated in S104 in the storage device.

In brief, in S101 through S104, the key generation device 100 generates the conversion key ck, the public key pk, and the secret key sk by executing the Setup algorithm indicated in Formula 140. Note that a $\mathcal{G}^{ZIPE,SK}_{ob}$ algorithm is as indicated in Formula 141. In S105, the key generation device 100 stores the conversion key ck, the public key pk, and the secret key sk that have been generated in the storage device.

[Formula 140]

Setup $(1^\lambda, n)$:

$(param_\mathbb{V}, \{B_{i,j}, B'_{i,j,2}, \ldots, B'_{i,j,n}, B''_{i,j,1}, \ldots, B''_{i,j,n-1}, B'''_{i,j}\}_{i,j=1,\ldots,6},$ $\{B^*_{i,j}, B'^*_{i,j,2}, \ldots, B'^*_{i,j,n}, B''^*_{i,j,1}, \ldots, B''^*_{i,j,n-1}, B'''^*_{i,j}\}_{i,j=1,\ldots,6})$ $\xleftarrow{R} \mathcal{G}^{ZIPE,SK}_{ob}(1^\lambda, 6, n),$ $$W \xleftarrow{U} \mathcal{L}(6, n, \mathbb{F}_q), \begin{pmatrix} d_1 \\ \vdots \\ d_{6n} \end{pmatrix} := \begin{pmatrix} b_1 \\ \vdots \\ b_{6n} \end{pmatrix} \cdot W,$$

using $\{D_{i,j}, D'_{i,j,2}, \ldots, D'_{i,j,n}, D''_{i,j,1}, \ldots, D''_{i,j,n-1}, D'''_{i,j}\}_{i,j=1,\ldots,6},$ return $pk := (1^\lambda, param_\mathbb{V},$ $\{D_{i,j}, D'_{i,j,2}, \ldots, D'_{i,j,n}, D''_{i,j,1}, \ldots, D''_{i,j,n-1}, D'''_{i,j}\}_{i=1,6;j=1,\ldots,6}),$ $ck := W,$ $sk := \{B^*_{i,j}, B'^*_{i,j,2}, \ldots, B'^*_{i,j,n}, B''^*_{i,j,1}, \ldots, B''^*_{i,j,n-1}, B'''^*_{i,j}\}_{i=1,5;j=1,\ldots,6}.$

[Formula 141]

$\mathcal{G}^{ZIPE,SK}_{ob}(1^\lambda, 6, n):$ $param_\mathbb{G} := (q, \mathbb{G}, \mathbb{G}_T, g, e) \xleftarrow{R} \mathcal{G}_{bpg}(1^\lambda),$ $N := 6n, \psi \xleftarrow{U} \mathbb{F}^\times_q, g_T := e(g, g)^\psi,$ $param_{\mathbb{V}'} := (q, \mathbb{V}, \mathbb{G}_T, \mathbb{A}, e) := \mathcal{G}_{dpvs}(1^\lambda, N, param_\mathbb{G}),$ $param_\mathbb{V} := (param_{\mathbb{V}'}, g_T), X \xleftarrow{U} \mathcal{L}(6, n, \mathbb{F}_q),$ hereafter, $\{\mu_{i,j}, \mu'_{i,j,2}, \ldots, \mu'_{i,j,n}, \mu''_{i,j,1}, \ldots, \mu''_{i,j,n-1}, \mu'''_{i,j}\}_{i,j=1,\ldots,6}$ denotes non-zero entries of $X$, and $\{v_{i,j}, v'_{i,j,2}, \ldots, v'_{i,j,n}, v''_{i,j,1}, \ldots, v''_{i,j,n-1}, v'''_{i,j}\}_{i,j=1,\ldots,6}$ denotes non-zero entries of $\psi(X^{-1})^T$, $\{B_{i,j} := \mu_{i,j}g, B'_{i,j,2} := \mu'_{i,j,2}g, \ldots, B'_{i,j,n} := \mu'_{i,j,n}g,$ $B''_{i,j,1} := \mu''_{i,j,1}g, \ldots, B''_{i,j,n-1} := \mu''_{i,j,n-1}g, B'''_{i,j} := \mu'''_{i,j}g\}_{i,j=1,\ldots,6},$ $\{B^*_{i,j} := v_{i,j}g, B'^*_{i,j,2} := v'_{i,j,2}g, \ldots, B'^*_{i,j,n} := v'_{i,j,n}g, B''^*_{i,j,1} := v''_{i,j,1}g,$ $\ldots, B''^*_{i,j,n-1} := v''_{i,j,n-1}g, B'''^*_{i,j} := v'''_{i,j}g\}_{i,j=1,\ldots,6},$ -continued $$\text{return}(param_\mathbb{V}, \{B_{i,j}, B'_{i,j,2}, \ldots, B'_{i,j,n}, B''_{i,j,1}, \ldots, B''_{i,j,n-1}, B'''_{i,j}\}_{i,j=1,\ldots,6},$$

$$\{B^*_{i,j}, B'^*_{i,j,2}, \ldots, B'^*_{i,j,n}, B''^*_{i,j,1}, \ldots, B'''^*_{i,j,n-1}, B''''^*_{i,j}\}_{i,j=1,\ldots,6}).$$

With reference to FIG. 7, the process of the TokenGen algorithm will be described.

S201 is the same as that in Embodiment 1, and thus will not be described.

(S202: Random Number Generation Step)

Using the processing device, the token generation part 140 generates random numbers, as indicated in Formula 142.

[Formula 142]

$$\sigma, \eta_1, \ldots, \eta_n \xleftarrow{U} \mathbb{F}_q$$

(S203: Token Element Generation Step)

Using the processing device, the token generation part 140 generates an element k* of a token $tk_v$, as indicated in Formula 143.

for $j=1, \ldots, 6$, $$K^*_{j,1} := \sum_{L=1}^{n-1}(\sigma v_L B''^*_{1,j,L} + \eta_L B''^*_{5,j,L}) + \sigma v_n B'''^*_{1,j} + \eta_n B'''^*_{5,j},$$

$$K^*_{j,L} := \sigma(v_L B^*_{1,j} + v_n B'^*_{1,j,L}) + \eta_L B^*_{5,j} + \eta_n B'^*_{5,j,L} \text{ for } L=2,\ldots,n-1,$$

$$K^*_{j,n} := \sigma v_n B'^*_{1,j,n} + \eta_n B'^*_{5,j,n},$$

$$k^* := (K^*_{1,1}, \ldots, K^*_{1,n}, \ldots, K^*_{6,1}, \ldots, K^*_{6,n}) \in \mathbb{G}^{6n} \quad [\text{Formula 143}]$$

(S204: Token Transmission Step)

Using the communication device and via the network, for example, the token transmission part 150 transmits the token $tk_v$ having the element k* generated in S203 to the decryption device 400 in secrecy. As a matter of course, the token $tk_v$ may be transmitted to the decryption device 400 by another method.

In brief, in S201 through S203, the key generation device 100 generates the token $tk_v$ by executing the TokenGen algorithm indicated in Formula 144. In S204, the key generation device 100 transmits the generated token $tk_v$ to the decryption device 400.

[Formula 144]

$$TokenGen(pk, sk, \vec{v} \in \mathbb{F}_q^n \setminus \{\vec{0}\}):$$

$$\sigma, \eta_1, \ldots, \eta_k \xleftarrow{U} \mathbb{F}_q,$$

for $j = 1, \ldots, 6$ $$K^*_{j,1} := \sum_{L=1}^{n-1}(\sigma v_L B''^*_{1,j,L} + \eta_L B''^*_{5,j,L}) + \sigma v_n B'''^*_{1,j} + \eta_n B'''^*_{5,j},$$

$$K^*_{j,L} := \sigma(v_L B^*_{1,j} + v_n B'^*_{1,j,L}) + \eta_L B^*_{5,j} + \eta_n B'^*_{5,j,L}$$

for $L = 2, \ldots, n-1$, $$K^*_{j,n} := \sigma v_n B'^*_{1,j,n} + \eta_n B'^*_{5,j,n}$$

-continued $$k^* := (K^*_{1,1}, \ldots, K^*_{1,n}, \ldots, K^*_{6,1}, \ldots, K^*_{6,n}) \in \mathbb{G}^{6n},$$

return $tk_v := k^*$.

With reference to FIG. 8, the process of the Enc algorithm will be described.

S301 and S302 are the same as those in Embodiment 1, and thus will not be described.

(S303: Random Number Generation Step)

Using the processing device, the ciphertext generation part 230 generates random numbers, as indicated in Formula 145.

[Formula 145]

$$\omega, \varphi_1, \ldots, \varphi_n \xleftarrow{U} \mathbb{F}_q$$

(S304: Cipher Element Generation Step)

Using the processing device, the ciphertext generation part 230 generates an element f of a ciphertext $ct_x$, as indicated in Formula 146.

for $j=1, \ldots, 6$, $$F_{j,1} := \omega x_1 D''_{1,j,1} + \varphi_1 D''_{6,j,1},$$

$$F_{j,L} := \omega(x_1 D''_{1,j,L} + x_L D_{1,j}) + \varphi_1 D''_{6,j,L} + \varphi_L D_{6,j}$$
for $L = 2, \ldots, n-1$, $$F_{j,n} := \omega x_1 D'''_{1,j} + \varphi_1 D'''_{6,j} + \sum_{L=2}^{n}(\omega x_L D''_{1,j,L} + \varphi_L D''_{6,j,L}),$$

$$f := (F_{1,1}, \ldots, F_{1,n}, \ldots, F_{6,1}, \ldots, F_{6,n}) \in \mathbb{G}^{6n}$$

(S305: Data Transmission Step)

Using the communication device and via the network, for example, the data transmission part 240 transmits the ciphertext $ct_x$ including the element f generated in S304 to the conversion device 300. As a matter of course, the ciphertext $ct_x$ may be transmitted to the conversion device 300 by another method.

In brief, in S301 through S304, the encryption device 200 generates the ciphertext $ct_x$ by executing the Enc algorithm indicated in Formula 147. In S305, the encryption device 200 transmits the generated ciphertext $ct_x$ to the conversion device 300.

[Formula 147]

$$Enc(pk, \vec{x} \in \mathbb{F}_q^n):$$

$$\omega, \varphi_1, \ldots, \varphi_n \xleftarrow{U} \mathbb{F}_q,$$

for $j = 1, \ldots, 6$, $$F_{j,1} := \omega x_1 D''_{1,j,1} + \varphi_1 D''_{6,j,1},$$

$$F_{j,L} := \omega(x_1 D''_{1,j,L} + x_L D_{1,j}) + \varphi_1 D''_{6,j,L} + \varphi_L D_{6,j}$$

for $L = 2, \ldots, n-1$, $$F_{j,n} := \omega x_1 D'''_{1,j} + \varphi_1 D'''_{6,j} + \sum_{L=2}^{n}(\omega x_L D''_{1,j,L} + \varphi_L D''_{6,j,L}),$$

$$f := (F_{1,1}, \ldots, F_{1,n}, \ldots, F_{6,1}, \ldots, F_{6,n}) \in \mathbb{G}^{6n},$$

return $ct_x := f$.

The Conv algorithm and the Query algorithm are the same as those in Embodiment 1, and thus will not be described.

However, in S403 of the Conv algorithm, the random number y is generated as indicated in Formula 148.

[Formula 149]

$$y \xleftarrow{U} span\langle d_{5n+1}, \ldots, d_{6n}\rangle$$

Note that $\{D_{i,j}, D'_{i,j,2}, \ldots, D'_{i,j,n}, D''_{i,j,1}, \ldots, D''_{i,j,n-1}, D'''_{i,j}\}_{i=1,6;j=1,\ldots,6}$ which is a part of the output of the Setup algorithm is identified with the basis $D^{\wedge}:=(d_1, \ldots, d_n, d_{5n+1}, \ldots, d_{6n})$. The basis $D:=(d_1, \ldots, d_{6n})$ is identified with $\{D_{i,j}, D'_{i,j,2}, \ldots, D'_{i,j,n}, D''_{i,j,1}, \ldots, D''_{i,j,n-1}, D'''_{i,j}\}_{i,j=1,\ldots,6}$.

$\{B^*_{i,j}, B^{'*}_{i,j,2}, \ldots, B^{'*}_{i,j,n}, B^{''*}_{i,j,1}, \ldots, B^{''*}_{i,j,n-1}, B^{'''*}_{i,j}\}_{i=1,5;i,j=1,\ldots,6}$ is identified with the basis $B^{*\wedge} := (B^*_1, \ldots, B^*_n, B^*_{4n+1}, \ldots, B^*_{5n})$. The basis $B^*:= (d^*_1, \ldots, d^*_{6n})$ is identified with $\{B^*_{i,j}, B^{'*}_{i,j,2}, \ldots, B^{'*}_{i,j,n}, B^{''*}_{i,j,1}, \ldots, B^{''*}_{i,j,n-1}, B^{'''*}_{i,j}\}_{i,j=1,\ldots,6}$.

Then, c and k* in the Query algorithm can be represented as indicated in Formula 149.

[Formula 149]

$$c := (\overset{n}{\omega \vec{x}}, \overset{3n}{0^{3n}}, \overset{n}{0^n}, \overset{n}{\vec{\varphi}})_B,$$

where $\vec{\varphi} := (\varphi_1, \ldots, \varphi_n) \in \mathbb{F}_q^n$, $$k^* := (\overset{n}{\sigma \vec{v}}, \overset{3n}{0^{3n}}, \overset{n}{\vec{\eta}}, \overset{n}{0^n})_{B^*},$$

where $\vec{\eta} := (\eta_1, \ldots, \eta_n) \in \mathbb{F}_q^n$

As described above, in the cryptographic system 10 according to Embodiment 2, a sparse matrix is employed for generating the orthonormal bases B and B*. With this arrangement, it is possible while maintaining security to reduce the size of the public parameter and the size of the master secret key and reduce the time required for the process to generate a secret key to be given to a user and the time required for the encryption process.

It has been described in the above that the orthonormal bases B and B* are generated using the sparse matrix indicated in Formula 132. However, the sparse matrix to be employed for generating the orthonormal bases B and B* is not limited to this. For example, a plurality of μ in Formula 132 may be respectively different values. In Formula 132, all entries in the n-th column are random numbers other than the constant value 0. Alternatively, all entries in at least another column, instead of the n-th column, may be random numbers other than the constant value 0. Likewise, in Formula 132, all entries in the first row are random numbers other than the constant value 0. Alternatively, all entries in at least another row, instead of the first row, may be random numbers other than the constant value 0.

More generally, it is required for the sparse matrix that at least one value other than the constant value 0 is included in each row and each column. Further, when the sparse matrix is an n-row and n-column matrix, it is desirable that at least n pieces of different values are included as values other than the constant value 0. Further, it is desirable for the sparse matrix that all entries in at least one column are values other than the constant value 0. Further, it is desirable for the sparse matrix that all entries in at least one row are values other than the constant value 0. Further, it is desirable for the sparse matrix that diagonal entries and all entries in at least one column and at least one row are values other than the constant value 0. Further, it is desirable for the sparse matrix that the values of diagonal entries are the same except for a column where all entries are values other than the constant value 0.

Even when such a sparse matrix is used, the size of the public parameter and the size of the secret key are reduced compared to when a regular matrix is used. The processing times for generating a user key and for the encryption process are also reduced.

However, depending on the format of the linear transformation X, it may not be possible to reduce the number of pairing operations.

In the above description, the method for determining whether or not the ciphertext $ct_x$ satisfies the condition which is set in the token $tk_v$ has been described. With this method, it is possible to construct a secure search system in which the ciphertext et can be searched for while remaining encrypted.

However, as discussed in Non-Patent Literature 2, by embedding a message m in a ciphertext $ct_x$, it is possible to construct a narrowly-defined cryptographic system in which the message m embedded in the ciphertext $ct_x$ is retrieved with the token $tk_v$.

Embodiment 3

Embodiment 3 describes an IPE-CC scheme which allows addition of an attribute category without reissuing a public parameter.

In Embodiment 3, what is the same as in Embodiment 1 will not be described, and differences from Embodiment 1 will be mainly described.

An attribute category is, for example, a classification of an attribute of each user, such as belonging organization, belonging department, position, age, and gender, or a classification of an attribute of a search condition.

Generally, attribute categories used for access control and search conditions are determined in advance at the design stage of a system. However, there may be a case where the operational rules of the system are changed at a later stage, necessitating addition of an attribute category used for access control and search conditions.

For example, suppose that a cryptographic system is constructed on the assumption that the system is to be used only within Company A. In this case, it is assumed that the attribute categories to be used for access control are belonging department, position, and individual ID, and the like. However, suppose that the operational rules are changed at a later stage so that the cryptographic system is used not only in Company A but also in an associated company of Company A. In this case, belonging company needs to be newly set as an attribute category to be used for access control.

In the IPE-CC scheme according to Embodiment 1, the basis vectors of the basis B and the basis B* are required for each attribute category. To add an attribute category, it is necessary to generate a new basis B and a new basis B* with increased dimensions. Because the basis B is included in the public parameter, the public parameter needs to be reissued and newly distributed to users. For this reason, an attribute category cannot be easily added at a later stage, and an operational mode that has not been taken into consideration at the design stage of the system cannot be flexibly adopted.

The configurations of the key generation device 100, the encryption device 200, the conversion device 300, and the decryption device 400 according to Embodiment 3 are respectively the same as the configurations of these devices illustrated in FIG. 2 to FIG. 5.

The flows of the Setup algorithm, the Enc algorithm, the Conv algorithm, and the Query algorithm according to Embodiment 3 are respectively the same as the flows of these algorithms illustrated in FIG. 6 and FIG. 8 to FIG. 10.

Figure 11:
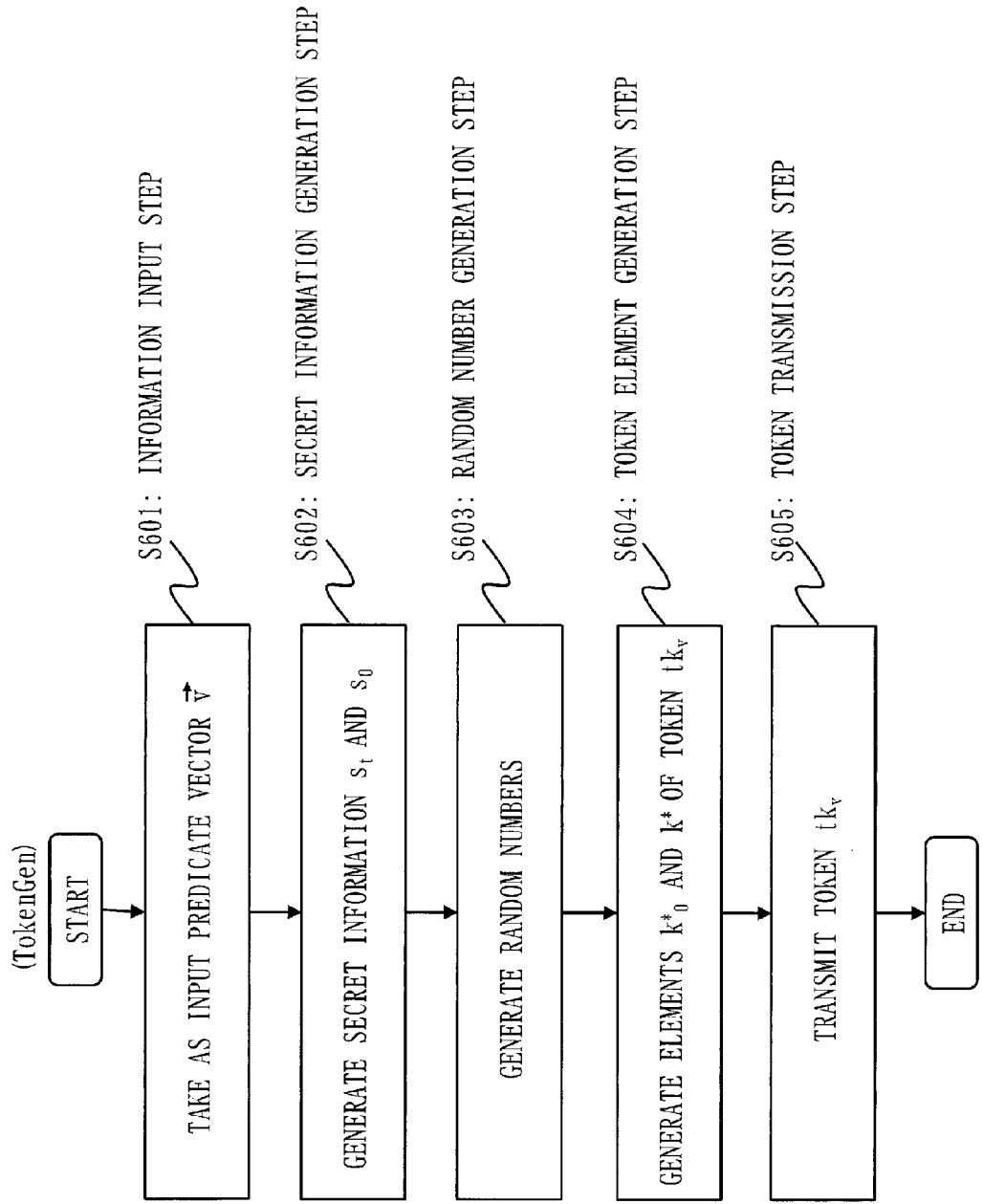
FIG. 11 is a flowchart illustrating the process of a Token-Gen algorithm according to Embodiment 3.

FIG. 11 is a flowchart illustrating the process of the TokenGen algorithm according to Embodiment 3.

With reference to FIG. 6, the process of the Setup algorithm will be described.

(S101: Orthonormal Basis Generation Step)

Using the processing device, the master key generation part 110 computes Formula 150, and thus generates a parameter $param_v$, a basis B, and a basis B*.

[Formula 150]

$$\text{input } 1^\lambda \quad (1)$$

$$N_0 := 1 + u_0 + w_0 + z_0, N_1 := 4 + u + w + z \quad (2)$$

$$param_\mathbb{G} := (q, \mathbb{G}, \mathbb{G}_T, g, e) \xleftarrow{R} \mathcal{G}_{bpg}(1^\lambda) \quad (3)$$

$$\psi \xleftarrow{U} \mathbb{F}_q^\times \quad (4)$$

For each t=0, 1, the following process (5) through (9) is executed.

$$param_{\mathbb{V}_t} := (q, \mathbb{V}_t, \mathbb{G}_T, \mathbb{A}_t, e) := \mathcal{G}_{dpvs}(1^\lambda, N_t, param_\mathbb{G}) \quad (5)$$

$$X_t := (\chi_{t,i,j})_{i,j=1,\ldots,N_t} \xleftarrow{U} GL(N_t, \mathbb{F}_q) \quad (6)$$

$$X_t^* := (\vartheta_{t,i,j})_{i,j=1,\ldots,N_t} := \psi \cdot (X_t^T)^{-1} \quad (7)$$

$$b_{t,i} := (\vec{\chi}_{t,i})_{\mathbb{A}_t} = \sum_{j=1}^{N_t} \chi_{t,i,j} a_{t,j} \text{ for } i = 1, \ldots, N_t, \quad (8)$$

$$\mathbb{B}_t := (b_{t,1}, \ldots, b_{t,N_t})$$

$$b_{t,i}^* := (\vec{\vartheta}_{t,i})_{\mathbb{A}_t} = \sum_{j=1}^{N_t} \vartheta_{t,i,j} a_{t,j} \text{ for } t = 1, \ldots, N_t, \quad (9)$$

$$\mathbb{B}_t^* := (b_{t,1}^*, \ldots, b_{t,N_t}^*)$$

$$g_T := e(g, g)^\psi, \quad (10)$$

$$param := (\{param_{\mathbb{V}_t}\}_{t=0,1}, g_T)$$

That is, the master key generation part 110 executes the following process (1) through (10).

(1) is the same as that in Embodiment 1, and thus will not be described.

(2) Using the processing device, the master key generation part 110 sets $1+u_0+w_0+z_0$ in $N_0$, and sets $4+u+w+z$ in $N_1$. Note that $u_0$, $w_0$, $z_0$, u, w, and z are integers of 0 or more.

(3) Using the processing device, the master key generation part 110 executes the algorithm $G_{bpg}$ taking as input the security parameter λ inputted in (1), and thus generates a parameter $param_G$ of bilinear pairing groups.

(4) Using the processing device, the master key generation part 110 generates a random number ψ.

Then, the master key generation part 110 executes the following process (5) through (9) for each t=0, 1.

(5) Using the processing device, the master key generation part 110 executes the algorithm $G_{dpvs}$ taking as input the security parameter λ inputted in (1), $N_t$ set in (2), and the values of $param_G:=(q, G, G_T, g, e)$ generated in (3), and thus generates values of a parameter $param_{V_t}:=(q, V_t, G_T, A_t, e)$ of dual pairing vector spaces.

(6) Using the processing device, the master key generation part 110 takes as input $N_t$ set in (2) and $F_q$, and randomly generates a linear transformation $X_t:=(\chi_{t,i,j})_{i,j}$. Note that $(\chi_{t,i,j})_{i,j}$ denotes a matrix concerning the suffixes i and j of the matrix $\chi_{t,i,j}$, where i, j=1, . . . , $N_t$.

(7) Using the processing device, the master key generation part 110 generates a linear transformation $X^*_t:=(v_{t,i,j})_{i,j}:=\psi\cdot(X_t^T)^{-1}$ based on the random number and the linear transformation $X_t$. Like $(\chi_{t,i,j})_{i,j}$, $(v_{t,i,j})_{i,j}$ denotes a matrix concerning the suffixes i and j of the matrix $v_{t,i,j}$, where i, j=1, . . . , $N_t$.

(8) Using the processing device, the master key generation part 110 generates a basis $B_t$ from the canonical basis $A_t$ generated in (5), based on the linear transformation $X_t$ generated in (6). Note that $\vec{x}_{t,i}$ denotes the i-th row of the linear transformation $X_t$.

(9) Using the processing device and based on $(v_{t,i,j})_{i,j}$ generated in (7), the master key generation part 110 generates a basis $B^*_t$ from the canonical basis $A_t$ generated in (5). Note that $\vec{v}_{t,i}$ denotes the i-th row of the linear transformation $X^*_t$.

(10) Using the processing device, the master key generation part 110 sets $e(g, g)^\psi$ in $g_T$. The master key generation part 110 also sets $\{param_{V_t}\}_{t=0,1}$ generated in (5) and $g_T$ in param.

In the following description, for simplicity, the basis $B_1$ and the basis $B^*_1$ will be described as the basis B and the basis B*.

(S102: Conversion Key Generation Step)

Using the processing device, the master key generation part 110 generates conversion information $W_0$ and W, as indicated in Formula 151. The master key generation part 110 designates the conversion information $W_0$ and W as a conversion key ck.

[Formula 151]

$$W_0 \xleftarrow{U} GL(N_0, \mathbb{F}_q),$$

$$W \xleftarrow{U} GL(N_1, \mathbb{F}_q)$$

(S103: Public Key Generation Step)

Using the processing device, the master key generation part 110 converts the basis $B_0$ and the basis B which have been generated in S101 with the conversion information $W_0$ and W, as indicated in Formula 152, and thus generates a basis $D_0$ and a basis D. Then, using the processing device, the master key generation part 110 generates a subbasis $\hat{D}_0$ of the basis $D_0$ and a subbasis $\hat{D}$ of the basis D, as indicated in Formula 152.

$$d_{0,i}:=b_{0,i}W_0 \text{ for } i=1,\ldots,1+u_0+w_0+z_0,$$

$$D_0:=(d_{0,1},\ldots,d_{0,1+u_0+w_0+z_0}),$$

$$\hat{D}_0:=(d_{0,1},d_{0,1+u_0+w_0+1}\ldots,d_{1+u_0+w_0+z_0}),$$

$$d_i:=b_iW \text{ for } i=1,\ldots,4+u+w+z,$$

$$D:=(d_1,\ldots,d_{4+u+w+z}),$$

$$\hat{D}:=(d_1,\ldots,d_{4+u+w+1}\ldots,d_{4+u+w+z}) \quad \text{[Formula 152]}$$

The master key generation part 110 designates a combination of the subbasis $\hat{D}_0$, the subbasis $\hat{D}$, the security parameter λ inputted in S101, and $\text{param}_{\vec{V}}$ generated in S101 as a public key pk.

(S104: Secret Key Generation Step)

Using the processing device, the master key generation part 110 generates a subbasis $\hat{B}^*_0$ of the basis $B^*_0$ and a subbasis $\hat{B}^*$ of the basis $B^*$, as indicated in Formula 153, the bases $B^*_0$ and $B^*$ having been generated in S101.

$$\hat{\mathbb{B}}^*_0 := (b^*_{0,1}, b^*_{0,1+u_0+1}, \ldots, b^*_{0,1+u_0+w_0}),$$

$$\hat{\mathbb{B}}^* := (b^*_1, \ldots, b^*_4, b^*_{4+u+1}, \ldots, b^*_{4+u+w}), \quad \text{[Formula 153]}$$

The master key generation part 110 designates the subbasis $\hat{B}^*_0$ and the subbasis $\hat{B}^*$ that have been generated as a secret key sk.

(S105: Key Storage Step)

The master key storage part 120 stores the conversion key ck generated in S102, the public key pk generated in S103, and the secret key sk generated in S104 in the storage device.

In brief, in S101 through S104, the key generation device 100 generates the conversion key ck, the public key pk, and the secret key sk by executing the Setup algorithm indicated in Formula 154. Note that a $G^{IPE}_{ob}$ algorithm is as indicated in Formula 155. In S105, the key generation device 100 stores the conversion key ck, the public key pk, and the secret key sk that have been generated in the storage device.

[Formula 154]

Setup($1^\lambda$):

$(param, (\mathbb{B}_0, \mathbb{B}^*_0), (\mathbb{B}, \mathbb{B}^*)) \xleftarrow{R} \mathcal{G}^{IPE}_{ob}(1^\lambda)$ $d_{0,i} := b_{0,i} W_0$ for $i = 1, \ldots, 1 + u_0 + w_0 + z_0$, $\mathbb{D}_0 := (d_{0,1}, \ldots, d_{0,1+u_0+w_0+z_0})$, $\hat{\mathbb{D}}_0 := (d_{0,1}, d_{0,1+u_0+w_0+1} \ldots, d_{1+u_0+w_0+z_0})$, $d_i := b_i W$ for $i = 1, \ldots, 4 + u + w + z$, $\mathbb{D} := (d_1, \ldots, d_{4+u+w+z})$, $\hat{\mathbb{D}} := (d_1, \ldots, d_4, d_{4+u+w+1} \ldots, d_{4+u+w+z})$, $\hat{\mathbb{B}}^*_0 := (b^*_{0,1}, b^*_{0,1+u_0+1,\ldots} b^*_{0,1+u_0+w_0})$, $\hat{\mathbb{B}}^* := (b^*_1, \ldots, b^*_4, b^*_{4+u+1}, \ldots, b^*_{4+u+w})$, return $pk := (1^\lambda, param, \hat{\mathbb{D}}_0, \hat{\mathbb{D}})$, $sk := (\hat{\mathbb{B}}^*_0, \hat{\mathbb{B}}^*)$.

[Formula 155]

$\mathcal{G}_{ob}(1^\lambda)$:

$N_0 := 1 + u_0 + w_0 + z_0, N_1 := 4 + u + w + z$, $param_\mathbb{G} := (q, \mathbb{G}, \mathbb{G}_T, g, e) \xleftarrow{R} \mathcal{G}_{bpg}(1^\lambda), \psi \xleftarrow{U} \mathbb{F}^\times_q$, for $t = 0, 1$, $param_{\mathbb{V}_t} := (q, \mathbb{V}_t, \mathbb{G}_T, \mathbb{A}_t, e) := \mathcal{G}_{dpvs}(1^\lambda, N_t, param_\mathbb{G})$, $X_t := (\chi_{t,i,j})_{i,j=1,\ldots,N_t} \xleftarrow{U} GL(N_t, \mathbb{F}_q)$, $X^*_t(\vartheta_{t,i,j})_{i,j=1,\ldots,N_t} := \psi \cdot (X^T_t)^{-1}$, hereafter, $\vec{\chi}_{t,i}$ and $\vec{\vartheta}_{t,i}$ denote the $i$-th rows of $X_t$ and $X^*_t$ for $i = 1, \ldots, N_t$, respectively, $b_{t,i} := (\vec{\chi}_{t,i})_{\mathbb{A}_t} = \sum_{j=1}^{N_t} \chi_{t,i,j} a_{t,j}$ for $i = 1, \ldots, N_t, \mathbb{B}_t := (b_{t,1}, \ldots, b_{t,N_t})$, $b^*_{t,i} := (\vec{\vartheta}_{t,i})_{\mathbb{A}_t} = \sum_{j=1}^{N_t} \vartheta_{t,i,j} a_{t,j}$ for $i = 1, \ldots, N_t, \mathbb{B}^*_t := (b^*_{t,1}, \ldots, b^*_{t,N_t})$, $g_T := e(g, g)^\psi$, $param := (\{param_{\mathbb{V}_t}\}_{t=0,1}, g_T)$, return ($param, \{\mathbb{B}_t, \mathbb{B}^*_t\}_{t=0,1}$).

With reference to FIG. 11, the process of the TokenGen algorithm will be described.

(S601: Information Input Step)

Using the input device, the information input part 130 takes as input a predicate vector $\vec{v} := \{(t, v_t) | t \in I_{\vec{v}}\}$. That is, the predicate vector $\vec{v}$ is a vector having as elements an index t and predicate information $v_t$ regarding the index t included in a set $I_{\vec{v}}$. As the predicate information $v_t$, attribute information of a user of a token $tk_v$, a search keyword, and so on are set, for example.

(S602: Secret Information Generation Step)

Using the processing device, the token generation part 140 generates secret information $s_t$ and $s_0$, as indicated in Formula 156.

[Formula 156]

$s_t \xleftarrow{U} \mathbb{F}_q$ for $(t, v_t) \in \vec{v}$, $s_0 := \sum_{(t,v_t) \in \vec{v}} s_t$ (S603: Random Number Generation Step)

Using the processing device, the token generation part 140 generates random numbers, as indicated in Formula 157.

[Formula 157]

$\vec{\eta}_0 := (\eta_{0,1}, \ldots, \eta_{0,w_0}) \xleftarrow{U} \mathbb{F}^{w_0}_q$, $\delta \xleftarrow{U} \mathbb{F}_q$, $\mu_t \xleftarrow{U} \mathbb{F}_q$ for $(t, v_t) \in \vec{v}$, $\vec{\eta}_t := (\eta_{t,1}, \ldots, \eta_{t,w}) \xleftarrow{U} \mathbb{F}^w_q$ for $(t, v_t) \in \vec{v}$ (S604: Token Element Generation Step)

Using the processing device, the token generation part 140 generates an element $k^*_0$ of the token $tk_v$, as indicated in Formula 158.

[Formula 158]

$k^*_0 := \left(-s_0, \overset{u_0}{0^{u_0}}, \overset{w_0}{\vec{\eta}_0}, \overset{z_0}{0^{z_0}}\right)_{\mathbb{B}^*_0}$ Using the processing device, the token generation part 140 also generates an element $k^*_t$ of the token $tk_v$ for the index t included in the set $I_{\vec{v}}$, as indicated in Formula 159.

[Formula 159]

$$k_t^* := \left(\frac{4}{\mu_t(t-1,), \delta v_t, s_t} \overset{u}{0^u}, \overset{w}{\vec{\eta}_t}, \overset{z}{0^z}\right)_{\mathbb{B}^*}$$

(S605: Token Distribution Step)

Using the communication device and via the network, for example, the token transmission part 150 distributes the token $tk_v$ having the elements $k^*_0$ and $k^*_t$ generated in S604 to the decryption device 400 in secrecy. As a matter of course, the token $tk_v$ may be distributed to the decryption device 400 by another method.

In brief, in S601 through S604, the key generation device 100 generates the token $tk_v$ by executing the TokenGen algorithm indicated in Formula 160. In S605, the key generation device 100 distributes the generated token $tk_v$ to the decryption device 400.

[Formula 160]

$$TokenGen(pk, sk, \vec{v} := \{(t, v_t) \mid t \in I_{\vec{v}}\}):$$

$$\delta, s_t \overset{U}{\leftarrow} \mathbb{F}_q \text{ for } (t, v_t) \in \vec{v}$$

$$\vec{\eta}_0 := (\eta_{0,1}, \ldots, \eta_{0,w_0}) \overset{U}{\leftarrow} \mathbb{F}_q^{w_0},$$

$$s_0 := \sum_{(t,v_t) \in \vec{v}} s_t,$$

$$k_0^* := \left(-s_0, \frac{u_0}{0^{u_0}}, \frac{w_0}{\vec{\eta}_0}, \frac{z_0}{0^{z_0}}\right)_{\mathbb{B}_0^*},$$

$$\text{for}(t, v_t) \in \vec{v},$$

$$\mu_t \overset{U}{\leftarrow} \mathbb{F}_q,$$

$$\vec{\eta}_t := (\eta_{t,1}, \ldots, \eta_{t,w}) \overset{U}{\leftarrow} \mathbb{F}_q^w,$$

$$k_t^* := \left(\frac{4}{\mu_t(t,-1,), \delta v_t, s_t} \overset{u}{0^u}, \overset{w}{\vec{\eta}_t}, \overset{z}{0^z}\right)_{\mathbb{B}^*},$$

$$\text{return } sk_v := \left(k_0^*, \{k_t^*\}_{(t,v_t) \in \vec{v}}\right).$$

With reference to FIG. 8, the process of the Enc algorithm will be described.

S301 is the same as that in Embodiment 1, and thus will not be described.

(S302: Information Input Step)

Using the input device, the information input part 220 takes as input an attribute vector $\vec{x} := \{(t, x_t) \mid t \in I_{\vec{x}}\}$. That is, the attribute vector $\vec{x}$ is a vector having as elements an index t and attribute information $x_t$ regarding the index t included in a set $I_{\vec{x}}$. In the attribute vector $\vec{x}$, attribute information of a user who is allowed to search and a search tag are set, for example.

(S303: Random Number Generation Step)

Using the processing device, the ciphertext generation part 230 generates random numbers, as indicated in Formula 161.

[Formula 161]

$$\omega, \tilde{\omega} \overset{U}{\leftarrow} \mathbb{F}_q,$$

$$\vec{\varphi}_0 := (\varphi_{0,1}, \ldots, \varphi_{0,z_0}) \overset{U}{\leftarrow} \mathbb{F}_q^{z_0},$$

-continued $$\sigma_t \overset{U}{\leftarrow} \mathbb{F}_q \text{ for } (t, x_t) \in \vec{x},$$

$$\vec{\varphi}_t = (\varphi_{t,1}, \ldots, \varphi_{t,z}) \overset{U}{\leftarrow} \mathbb{F}_q^z \text{ for } (t, x_t) \in \vec{x}$$

(S304: Cipher Element Generation Step)

Using the processing device, the ciphertext generation part 230 generates an element $f_0$ of a ciphertext $ct_x$, as indicated in Formula 162.

[Formula 162]

$$f_0 := \left(\tilde{\omega}, \frac{u_0}{0^{u_0}}, \frac{w_0}{0^{w_0}}, \frac{z_0}{\vec{\varphi}_0,}\right)_{\mathbb{B}_0},$$

Using the processing device, the ciphertext generation part 230 also generates an element $f_t$ of the ciphertext $ct_x$ for the index t included in the set $I_{\vec{x}}$, as indicated in Formula 163.

[Formula 163]

$$f_t = \left(\frac{4}{\sigma_t(1,t), \omega x_t, \tilde{\omega}} \overset{u}{0^u}, \overset{w}{0^w}, \overset{z}{\vec{\varphi}_t}\right)_{\mathbb{B}},$$

(S305: Data Transmission Step)

Using the communication device and via the network, for example, the data transmission part 240 transmits the ciphertext $ct_x$ having the elements $f_0$ and $f_t$ generated in S304 to the conversion device 300. As a matter of course, the ciphertext $ct_x$ may be transmitted to the conversion device 300 by another method.

In brief, in S301 through S304, the encryption device 200 generates the ciphertext $ct_x$ by executing the Enc algorithm indicated in Formula 164. In S305, the encryption device 200 transmits the generated ciphertext $ct_x$ to the conversion device 300.

[Formula 164]

$$Enc(pk, \vec{x} := \{(t, x_t) \mid t \in I_{\vec{x}}\}):$$

$$\omega, \tilde{\omega} \overset{U}{\leftarrow} \mathbb{F}_q, \vec{\varphi}_0 := (\varphi_{0,1}, \ldots, \varphi_{0,z_0}) \overset{U}{\leftarrow} \mathbb{F}_q^{z_0},$$

$$f_0 := \left(\tilde{\omega}, \frac{u_0}{0^{u_0}}, \frac{w_0}{0^{w_0}}, \frac{z_0}{\vec{\varphi}_0,}\right)_{\mathbb{B}_0},$$

$$\text{for } (t, x_t) \in \vec{x},$$

$$\sigma_t \overset{U}{\leftarrow} \mathbb{F}_q, \vec{\varphi}_t := (\varphi_{t,1}, \ldots, \varphi_{t,z}) \overset{U}{\leftarrow} \mathbb{F}_q^z,$$

$$f_t = \left(\frac{4}{\sigma_t(1,t), \omega x_t, \tilde{\omega}} \overset{u}{0^u}, \overset{w}{0^w}, \overset{z}{\vec{\varphi}_t}\right)_{\mathbb{B}},$$

$$\text{return } ct_x := \left(f_0, \{f_t\}_{(t,x_t) \in \vec{x}}\right).$$

With reference to FIG. 9, the process of the Conv algorithm will be described.

(S401: Conversion Key Acquisition Step)

Using the communication device and via the network, for example, the conversion key acquisition part 310 obtains the conversion key $ck := (W_0, W)$ transmitted by the key generation device 100. The conversion key acquisition part 310 also obtains the public key pk generated by the key generation device 100.

(S402: Ciphertext Acquisition Step)
Using the communication device and via the network, for example, the ciphertext acquisition part 320 receives the ciphertext $ct_x:=(f_0, f)$ transmitted by the encryption device 200.

(S403: Random Number Generation Step)
Using the processing device, the ciphertext conversion part 330 generates random numbers, as indicated in Formula 165.

[Formula 165]

$$\rho_0 \xleftarrow{U} \mathbb{F}_q,$$

$$y_0 \xleftarrow{U} \text{span}\langle d_{1+u_0+w_0+1}, \ldots, d_{1+u_0+w_0+z_0}\rangle,$$

$$\rho \xleftarrow{U} \mathbb{F}_q,$$

$$y \xleftarrow{U} \text{span}\langle d_{4+u+w+1}, \ldots, d_{4+u+w+z}\rangle$$

(S404: Ciphertext Conversion Step)
Using the processing device, the ciphertext conversion part 330 coverts the ciphertext $ct_x$, as indicated in Formula 166, and thus generates an element $c_0$ and an element $c_t$.

$$c_0:=(\rho_0 f_0 + y_0)W_0^{-1},$$

$$c_t:=(\rho f+y)W^{-1} \qquad \text{[Formula 166]}$$

(S405: Data Transmission Step)
Using the communication device and via the network, for example, the data transmission part 340 transmits the ciphertext $CT_x$ including the element $c_0$ and the element $c_t$ generated in S404 to the decryption device 400. As a matter of course, the ciphertext $CT_x$ may be transmitted to the decryption device 400 by another method.

In brief, in S401 through S404, the conversion device 300 generates the ciphertext $CT_x$ by executing the Conv algorithm indicated in Formula 167. In S405, the conversion device 300 transmits the generated ciphertext $CT_x$ to the decryption device 400.

[Formula 167]

$Conv(pk, ck := W, ct_x := f)$:

$$\rho_0 \xleftarrow{U} \mathbb{F}_q, y_0 \xleftarrow{U} \text{span}\langle d_{1+u_0+w_0+1}, \ldots, d_{1+u_0+w_0+z_0}\rangle,$$

$$\rho \xleftarrow{U} \mathbb{F}_q, y \xleftarrow{U} \text{span}\langle d_{n+u+w+1}, \ldots, d_{n+u+w+z}\rangle,$$

$$c_0 := (\rho_0 f_0 + y_0)W_0^{-1}, c_t := (\rho f + y)W^{-1}$$

return $CT_x := (c_0, c)$.

With reference to FIG. 10, the process of the Query algorithm will be described.

(S501: Token Acquisition Step)
Using the communication device and via the network, for example, the token acquisition part 410 obtains the token $tk_v:=(k^*_0, k^*_t)$ transmitted by the key generation device 100. The token acquisition part 410 also obtains the public key pk generated by the key generation device 100.

(S502: Ciphertext Acquisition Step)
Using the communication device and via the network, for example, the ciphertext acquisition part 420 receives the ciphertext $CT_x:=(c_0, c_t)$ transmitted by the conversion device 300.

(S503: Decryption Step)
Using the processing device, the decryption part 430 outputs 1 indicating that decryption has been successful if the set $I_{\vec{v}}$ is a subset of the set $I_{\vec{x}}$ and a result of computing a pairing operation $e(c_0, k^*_0) \cdot \Pi_{t \in I_{\vec{v}}} e(c_t, k^*_t)$ is 1, and outputs 0 indicating that decryption has failed if the result is not 1.

In brief, in S501 through S503, the decryption device 400 executes the Query algorithm indicated in Formula 168, and thus determines whether or not decryption has been successful.

$\text{Query}(pk, tk_v:=(k^*_0, k^*_t), CT_x:=(c_0, c_t))$:

if $I_{\vec{v}} \subseteq I_{\vec{x}}$ and $e(c_0, k^*_0) \cdot \Pi_{t \in I_{\vec{v}}} e(c_t, k^*_t)=1$, output 1, otherwise, output 0. [Formula 168]

As described above, in the inner-product predicate encryption scheme according to Embodiment 3, if the set $I_{\vec{v}}$ is a subset of $I_{\vec{x}}$ and the sum of $v_t x_t$ for the index t included in the set $I_{\vec{v}}$ is 0, the ciphertext $ct_x$ can be decrypted with the token $tk_v$ even when the dimensions of the attribute vector $\vec{x}$ and the predicate vector $\vec{v}$ are not the same.

In the inner-product predicate encryption scheme according to Embodiment 3, $\mu_t t$ and $-\mu_t$ are respectively set as the coefficient of the basis vectors $b^*_1$ and $b^*_2$ (basis vector $b^*_{index}$) for the element $k^*_t$ of the decryption key $sk_v$. In the cryptographic system 10, $\sigma_t$ and $\sigma_t t$ are respectively set as the coefficient of the basis vectors $b_1$ and $b_2$ (basis vector $b_{index}$) for the element $c_t$ of the ciphertext $ct_x$.

Because of these arrangements, when a pairing operation is performed on the element $k^*_t$ and the element $c_t$ for the corresponding index t, an inner-product of 0 is obtained for portions constituted by the basis vectors $b^*_1$ and $b^*_2$ and the basis vectors $b_1$ and $b_2$, which are thus canceled out. That is, when a pairing operation is performed on the element $k^*_t$ and the element $c_t$ for the corresponding index t, the index parts that are set as the coefficients of the basis vectors (portions constituted by the basis vectors $b^*_1$ and $b^*_2$ and the basis vectors $b_1$ and $b_2$) are canceled out, and a result of the pairing operation for the remaining portions can be obtained.

In the inner-product predicate encryption scheme according to Embodiment 3, the index parts are provided, so that the bases that are used for every attribute category can be constructed as the common bases (basis B and basis B*). As a result, only the basis B and the basis B* need to be included in a public parameter, eliminating the need for reissuing the public parameter when an attribute category is to be added at a later stage.

For the index parts, it is required that 0 be obtained as a result of an inner-product operation of the index parts. Therefore, although the 2-dimensional index parts, namely the basis vectors $b^*_1$ and $b^*_2$ and the basis vectors $b_1$ and $b_2$, are employed in the above description, the index parts are not limited to 2-dimensional and may be 3-dimensional or higher-dimensional. The values assigned to the index parts are not limited to those described above, and a different assignment arrangement may be employed.

In the above, the IPE-CC scheme corresponding to Type 1 of Non-Patent Literature 4 has been described in which decryption is possible if the set $I_{\vec{v}}$ is a subset of set $I_{\vec{x}}$.

However, by applying the above-described algorithms in a similar manner, it is possible to construct an IPE-CC scheme corresponding to Type 2 of Non-Patent Literature 4 (IPE-CC scheme in which decryption is possible if the set $I_{\vec{x}}$ is a subset of the set $I_{\vec{v}}$) and an IPE-CC scheme corresponding to Type 0 of Non-Patent Literature 4 (IPE-CC scheme in which decryption is possible if the set $I_{v\to}$ is a subset of the set $I_{x\to}$ and the set $I_{x\to}$ is a subset of the $I_{v\to}$).

In the above, the method for determining whether or not the ciphertext $ct_x$ satisfies the condition which is set in the token $tk_v$ has been described. With this method, a secure search system can be constructed in which the ciphertext $ct_x$ can be searched for while remaining encrypted.

However, as described in Non-Patent Literature 2 and so on, by embedding a message m in a ciphertext $ct_x$, a narrowly-defined cryptographic system can be constructed in which the message m embedded in the ciphertext $ct_x$ is retrieved with the token $tk_v$.

Embodiment 4

Embodiment 4 briefly describes that an IPE-CC scheme having a delegation system is constructed by applying the construction of Non-Patent Literature 2 to the IPE-CC scheme described in the above embodiments.

An example in which the IPE-CC scheme described in Embodiment 1 is provided with a delegation system will be presented herein. Formula 169 through Formula 173 indicate the Setup algorithm, the TokenGen algorithm, and the Enc algorithm, the Query algorithm, and the Delegate algorithm when the IPE-CC scheme described in Embodiment 1 is provided with the delegation system. The Conv algorithm is the same as that in Embodiment 1, and thus will not be described.

For simplicity, an IPE-CC scheme with a two-layer delegation system will be described herein. However, by applying the scheme presented herein, an IPE-CC scheme having a d-layer (d is an integer of 3 or more) delegation system can be easily implemented.

[Formula 169]

$Setup(1^\lambda, (n_1, n_2))$:

$n := n_1 + n_2$, $(param_\mathbb{V}, \mathbb{B} := (b_1, \ldots, b_{n+u+w+z})$, $\mathbb{B}^* := (b_1^*, \ldots, b_{n+u+w+z}^*)) \xleftarrow{R} \mathcal{G}_{ob}^{IPE}(1^\lambda, n)$, $W \xleftarrow{U} GL(N, \mathbb{F}_q)$, $d_i := b_i W$ for $i = 1, \ldots, n+u+w+z$, $\mathbb{D} := (d_1, \ldots, d_{n+u+w+z})$, $\hat{\mathbb{D}} := (d_1, \ldots, d_n, d_{n+u+w+1}, \ldots, d_{n+u+w+z})$, $\hat{\mathbb{B}}^* := (b_1^*, \ldots, b_n^*, b_{n+u+1}^*, \ldots, b_{n+u+w}^*)$, return $pk := (1^\lambda, param_\mathbb{V}, \hat{\mathbb{D}})$, $ck := W$, $sk := \hat{\mathbb{B}}^*$.

$\mathcal{G}_{ob}^{IPE}(1^\lambda, n)$:

$N := n + u + w + z$, $param_\mathbb{G} := (q, \mathbb{G}, \mathbb{G}_T, g, e) \xleftarrow{R} \mathcal{G}_{bpg}(1^\lambda)$, $param_{\mathbb{V}'} := (q, \mathbb{V}, \mathbb{G}_T, \mathbb{A}, e) \xleftarrow{R} \mathcal{G}_{dpvs}(1^\lambda, N)$, $\psi \xleftarrow{U} \mathbb{F}_q^\times$, $g_T := e(g, g)^\psi$, $X := (\chi_{i,j}) \xleftarrow{U} GL(N, \mathbb{F}_q)$, $(\vartheta_{i,j}) := \psi \cdot (X^T)^{-1}$, $param_\mathbb{V} := (param_{\mathbb{V}'}, g_T)$, $b_i := \sum_{j=1}^{N} \chi_{i,j} a_j$, $\mathbb{B} := (b_1, \ldots, b_N)$, -continued $b_i^* := \sum_{j=1}^{N} \vartheta_{i,j} a_j$, $\mathbb{B}^* := (b_1^*, \ldots, b_N^*)$, return $(param_\mathbb{V}, \mathbb{B}, \mathbb{B}^*)$.

[Formula 170]

$TokenGen(pk, sk, \vec{v}_1 \in \mathbb{F}_q^{n_1} \setminus \{\vec{0}\})$:

$\delta, \phi \xleftarrow{U} \mathbb{F}_q$, $\vec{\eta}_0, \vec{\eta}_1, \ldots, \vec{\eta}_{n_2} \xleftarrow{U} \mathbb{F}_q^w$, $k_0^* := \left( \frac{n}{\sigma \vec{v}_1, 0^{n_2}}, \frac{u}{0^u}, \frac{w}{\vec{\eta}_0}, \frac{z}{0^z} \right)_{\mathbb{B}^*}$, $k_i^* := \left( \frac{n}{\sigma \vec{v}_1, \phi \vec{e}_i}, \frac{u}{0^u}, \frac{w}{\vec{\eta}_i}, \frac{z}{0^z} \right)_{\mathbb{B}^*}$, for $i = 1, \ldots, n_2$, where $\vec{e}_i := (0^{i-1}, 1, 0^{n_2-i})$, return $tk_{v_1} := (k_0^*, k_1^*, \ldots, k_{n_2}^*)$.

[Formula 171]

$Enc(pk, \vec{x}_1 \in \mathbb{F}_q^{n_1} \setminus \{\vec{0}\}, \vec{x}_2 \in \mathbb{F}_q^{n_2})$:

$\tau_1, \tau_2 \xleftarrow{U} \mathbb{F}_q$, $\vec{\xi} \xleftarrow{U} \mathbb{F}_q^z$, if $\vec{x}_2 = \vec{0}$, $\vec{x}_2' \xleftarrow{U} \mathbb{F}_q^{n_2}$, else $\vec{x}_2' := \vec{x}_2$, $f := \left( \frac{n}{\tau_1 \vec{x}_1, \tau_2 \vec{x}_2'}, \frac{u}{0^u}, \frac{w}{0^w}, \vec{\xi} \right)_\mathbb{D}$, return $ct_x := f$.

[Formula 172]

$Query(pk, tk := tk_{v_1}$ or $tk_{(v_1, v_2)}, CT_x := c)$:

if $tk = tk_{v_1} = (k_0^*, k_1^*, \ldots, k_{n_2-n_1}^*)$, if $e(c, k_0^*) = 1$, output 1, otherwise, output 0 if $tk = tk_{(v_1, v_2)} = \tilde{k}^*$, if $e(c, k^*) = 1$, output 1, otherwise, output 0.

[Formula 173]

$Delegate(pk, tk_{v_1} := (k_0^*, k_1^*, \ldots, k_{n_2}^*)$, $\vec{v}_2 := (v_{2,1}, \ldots, v_{2,n_2}) \in \mathbb{F}_q^{n_2} \setminus \{\vec{0}\})$:

$\xi, \delta \xleftarrow{U} \mathbb{F}_q$, $\vec{\eta}' := (\vec{\eta}_1', \ldots, \vec{\eta}_n') \xleftarrow{U} \mathbb{F}_q^n$, $\tilde{k}^* := \xi k_0^* + \delta \left( \sum_{i=1}^{n_2} v_{2,i} k_i^* \right) + \sum_{i=1}^{n} \vec{\eta}_i' b_{4n+i}^*$, return $tk_{(\vec{v}_1, \vec{v}_2)} = tk_{(\vec{v}_1 \wedge \vec{v}_2)} := \tilde{k}^*$.

Embodiment 5

Embodiment 5 describes a secure search system 500 which is an application of the cryptographic system 10 described in the above embodiments to a medical information DB (database).

Figure 12:
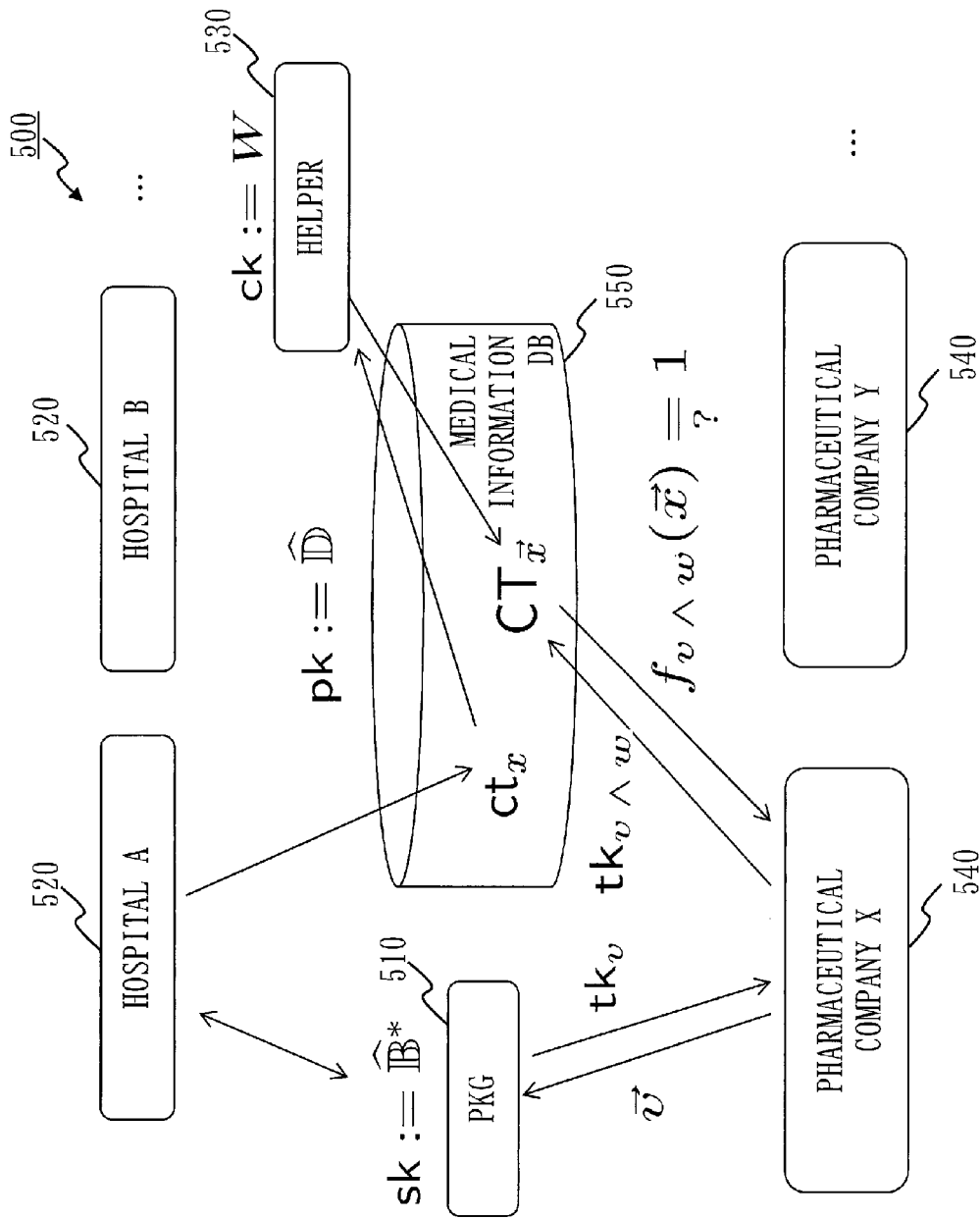
FIG. 12 is a configuration diagram of a secure search system 500 according to Embodiment 5.

FIG. 12 is a configuration diagram of the secure search system 500 according to Embodiment 5.

The secure search system 500 includes a PKG 510, a plurality of hospitals 520, a helper 530, a plurality of pharmaceutical companies 540, and a medical information DB 550.

Using the key generation device 100, the PKG executes the Setup algorithm, and thus generates a public key pk:=$\hat{D}$, a secret key sk:=$\hat{B}^*$, and a conversion key ck:=W.

Using the encryption device 200, each hospital 520 executes the Enc algorithm, and thus generates a ciphertext $ct_x$ in which the DNA information of a patient or the like is encrypted. Then, each hospital 520 registers the generated ciphertext $ct_x$ in the medical information DB 550.

Using the conversion device 300, the helper 530 executes the Conv algorithm, and thus converts the ciphertext $ct_x$ registered in the medical information DB 550 to generate a ciphertext $CT_x$. The helper 530 registers the generated ciphertext $CT_x$ in the medical information DB 550.

Each pharmaceutical company 540, who conducts a search, transmits a predicate vector $\vec{v}$ in which its own attribute information is set to the PKG 510 from a terminal such as a PC (Personal Computer). Then, using the key generation device 100, the PKG 510 executes the TokenGen algorithm, and thus generates a token $tk_v$ based on the transmitted predicate vector $\vec{v}$. Then, the PKG 510 transmits the generated token $tk_v$ to the pharmaceutical company who has transmitted the predicate vector $\vec{v}$.

After receiving the token $tk_v$, the pharmaceutical company 540 transmits a token $tk_{v,\omega}$ in which a search condition ($\vec{\omega}$) is set in the received token $tk_v$ to the medical information DB 550 from the terminal to request a search based on the token $tk_v$. As a method for setting the search condition ($\vec{\omega}$) in the token $tk_v$, there is a method in which the delegation described in Embodiment 4 is adapted.

Upon receiving the request for the search, the medical information DB 550 executes the Query algorithm on each registered ciphertext $CT_x$ and the transmitted token $tk_v$ using the decryption device 400, and transmits a result to the pharmaceutical company 540 who has requested the search. The result to be transmitted may include an identifier or the like of the ciphertext $CT_x$ that has been decrypted by the Query algorithm.

Figure 13:
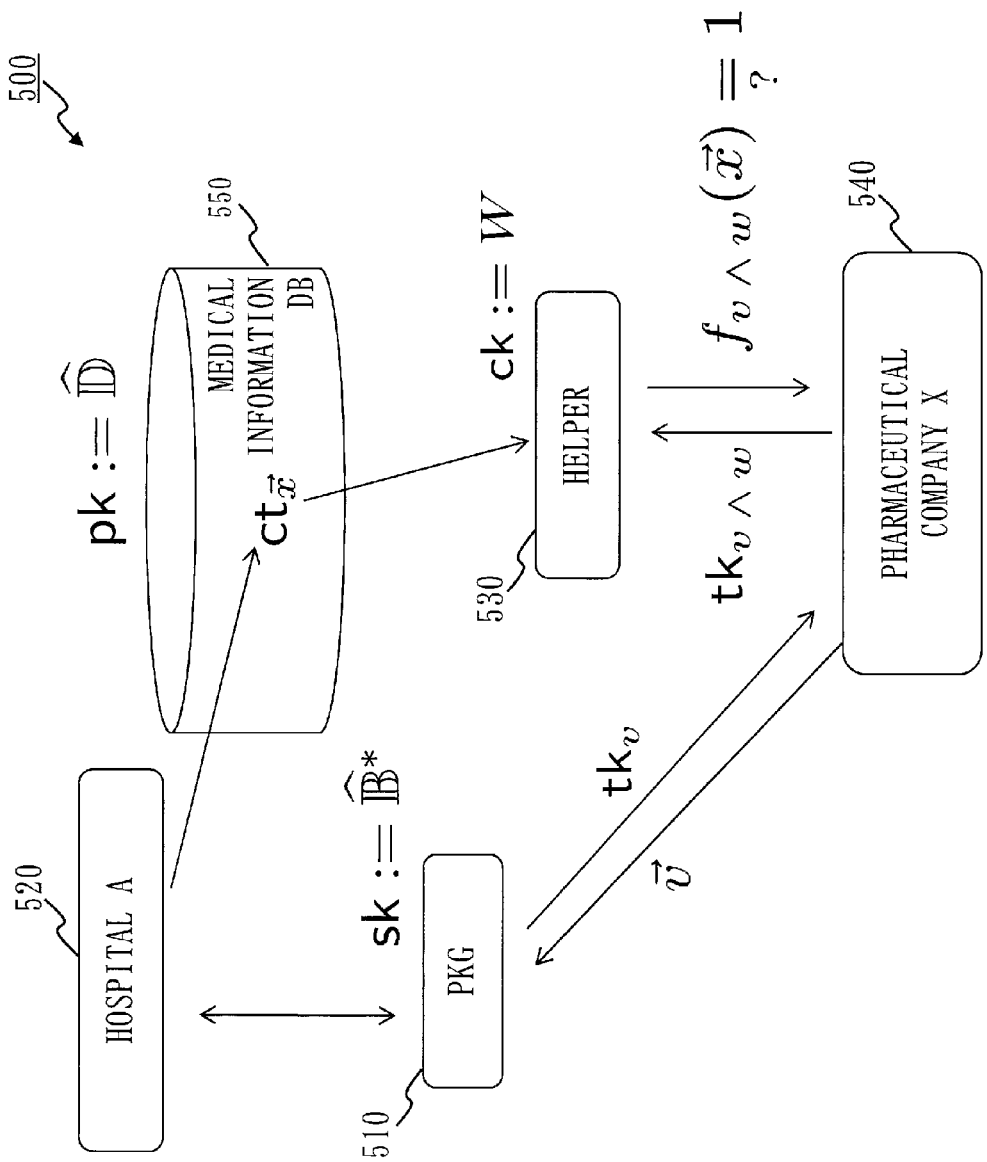
FIG. 13 is a configuration diagram of a secure search system 500 having a configuration different from that of FIG. 12.

FIG. 13 is a configuration diagram of a secure search system 500 having a different configuration from that of FIG. 12.

The secure search system 500 illustrated in FIG. 13 differs from the secure search system 500 illustrated in FIG. 12 in that the helper 530 is positioned between the pharmaceutical company 540 and the medical information DB 550.

In the secure search system 500 illustrated in FIG. 12, the helper 530 generates a ciphertext $CT_x$ and registers the ciphertext $CT_x$ in the medical information DB 550. After receiving a request for a search, the medical information DB 550 executes the Query algorithm and returns a result to the pharmaceutical company 540.

In the secure search system 500 illustrated in FIG. 13, when the helper 530 receives a request for a search, the helper 530 executes the Conv algorithm, and thus converts each ciphertext $ct_x$ registered in the medical information DB 550 to generate a ciphertext $CT_x$. Then, using the decryption device 400, the helper 530 executes the Query algorithm on each ciphertext $CT_x$ that has been generated and the transmitted token $tk_v$, and transmits a result to the pharmaceutical company 540 who has requested the search.

In the above description, the hospital 520 and the pharmaceutical company 540 are examples, and may be replaced by other establishments.

Embodiment 6

In the above embodiments, the methods for implementing the cryptographic processes in dual vector spaces have been described. In Embodiment 6, a method for implementing the cryptographic processes in dual modules will be described.

That is, in the above embodiments, the cryptographic processes are implemented in cyclic groups of prime order q. However, when a ring R is expressed using a composite number M as indicated in Formula 174, the cryptographic processes described in the above embodiments can be adapted to a module having the ring R as a coefficient.

$$\mathbb{R} := \mathbb{Z}/M\mathbb{Z} \qquad \text{[Formula 174]}$$

where
$\mathbb{Z}$: integer, and
M: composite number.

By changing $F_q$ to R in the algorithms described in the above embodiments, the cryptographic processes in dual additive groups can be implemented.

Figure 14:
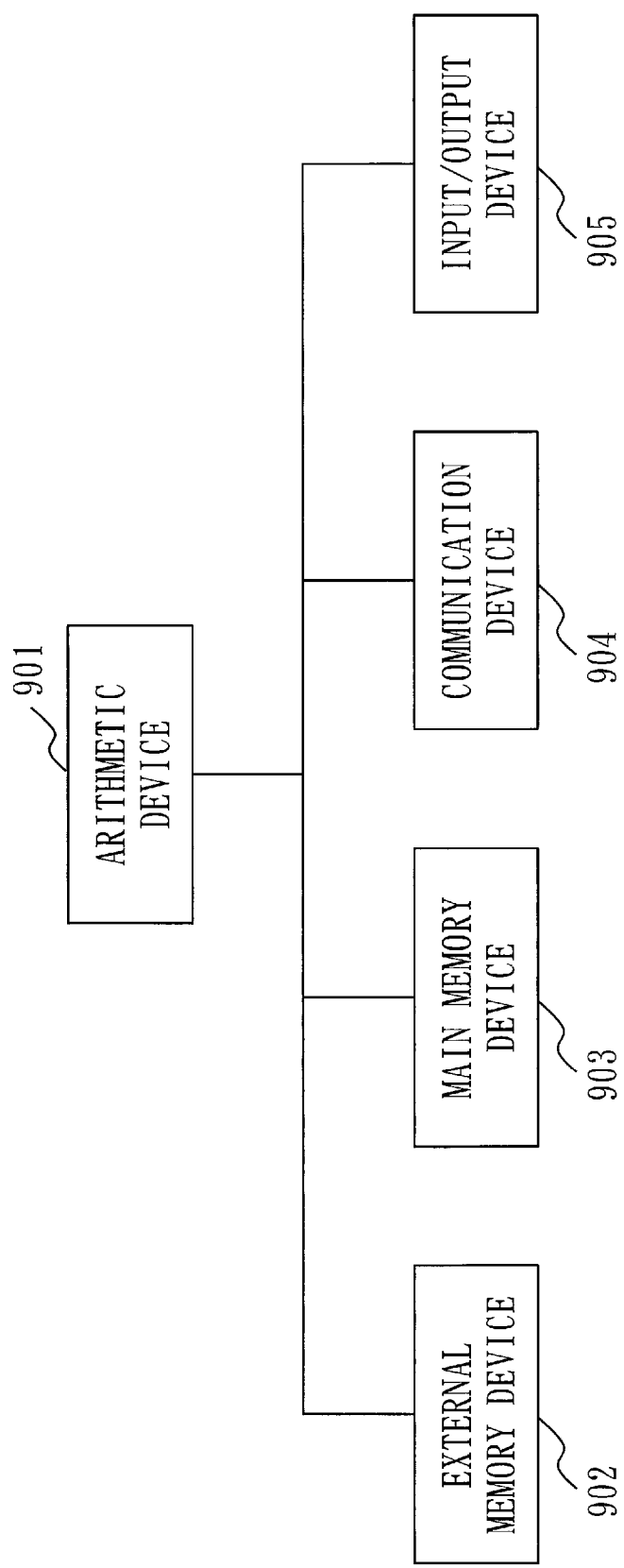
FIG. 14 is a diagram illustrating an example of the hardware configuration of the key generation device 100, the encryption device 200, the conversion device 300, and the decryption device 400 presented in the above embodiments.

FIG. 14 is a diagram illustrating an example of the hardware configuration of the key generation device 100, the encryption device 200, the conversion device 300, and the decryption device 400 presented in the above embodiments.

Each of the key generation device 100, the encryption device 200, the conversion device 300, and the decryption device 400 is a computer, and each component of the key generation device 100, the encryption device 200, the conversion device 300, and the decryption device 400 can be implemented by a program.

As the hardware configuration of the key generation device 100, the encryption device 200, the conversion device 300, and the decryption device 400, an arithmetic device 901, an external memory device 902, a main memory device 903, a communication device 904, and an input/output device 905 are connected to a bus.

The arithmetic device 901 is a CPU (Central Processing Unit) or the like that executes programs. The external memory device 902 is, for example, a ROM (Read Only Memory), a flash memory, a hard disk device, and the like. The main memory device 903 is a RAM (Random Access Memory) and the like. The communication device 904 is a network card and the like. The input/output device 905 is, for example, a mouse, a keyboard, a display device, and the like.

The programs are normally stored in the external memory device 902, and are loaded into the main memory device 903 to be sequentially read and executed by the arithmetic device 901.

The programs realize the functions described as the master key generation part 110, the master key storage part 120, the information input part 130, the token generation part 140, the token transmission part 150, the public key acquisition part 210, the information input part 220, the ciphertext generation part 230, the data transmission part 240, the conversion key acquisition part 310, the ciphertext acquisition part 320, the ciphertext conversion part 330, the data transmission part 340, the token acquisition part 410, the ciphertext acquisition part 420, and the decryption part 430.

Further, the external memory device 902 stores an operating system (OS). At least a part of the OS is loaded into the main memory device 903. The arithmetic device 901 executes the programs while executing the OS.

Information, data, signal values, and variable values indicating results of processes described as "compute", "receive", "transmit" and so on in the description of Embodiments 1 to 6 are stored as files in the main memory device 903.

The configuration of FIG. 14 is an example of the hardware configuration of the key generation device 100, the encryption device 200, the conversion device 300, and the decryption device 400. The hardware configuration of the key generation device 100, the encryption device 200, the conversion device 300, and the decryption device 400 is not limited to and may be different from the configuration described in FIG. 14.

REFERENCE SIGNS LIST

10: cryptographic system, 100: key generation device, 110: master key generation part, 120: master key storage part, 130: information input part, 140 token generation part, 150: token transmission part, 200: encryption device, 210 public key acquisition part, 220: information input part, 230: ciphertext generation part, 240: data transmission part, 300: conversion device, 310: conversion key acquisition part, 320: ciphertext acquisition part, 330: ciphertext conversion part, 340: data transmission part, 400: decryption device, 410: token acquisition part, 420: ciphertext acquisition part, 430: decryption part, 901: arithmetic device, 902: external memory device, 903: main memory device, 904: communication device, 905: input/output device

The invention claimed is:

1. A cryptographic system for concealment of both attribute information and predicate information in a search query, the system comprising:
an encryption device that generates a ciphertext $ct_x$ in which attribute information x is set as a coefficient of a basis vector of a basis D;
a conversion device that converts, using conversion information W, the basis D of the ciphertext $ct_x$ generated by the encryption device to a basis B so as to generate a ciphertext $CT_x$; and
a decryption device that decrypts the ciphertext $CT_x$ generated by the conversion device with a token $tk_v$ in which predicate information v is set as a coefficient of a basis vector of a basis B* corresponding to the basis B, determines whether or not the ciphertext condition which is set in the token $tk_v$ based on the decryption of the ciphertext CTx, and outputs result of the query based on the determination.

2. The cryptographic system according to claim 1, wherein the decryption device decrypts the ciphertext $CT_x$ by performing a pairing operation on the ciphertext $CT_x$ and the token $tk_v$ and thereby computing an inner-product of the attribute information x and the predicate information v.

3. The cryptographic system according to claim 2,
wherein the encryption device generates the ciphertext $ct_x$ including an element f indicated in Formula 1
wherein the conversion device generates a ciphertext $CT_x$ including an element c indicated in Formula 2, and
wherein the decryption device decrypts the ciphertext $CT_x$ by performing a pairing operation indicated in Formula 3

[Formula 1]

$$f := (\overset{n}{\overrightarrow{\tau x}})D$$

where $\tau \xleftarrow{U} F_q,$ $\vec{x} := x_1, \ldots, x_n,$ and $x_1, \ldots, x_n$ is the attribute information x;

[Formula 2]

$$c := \rho f \cdot W^{-1}$$

where $\rho \xleftarrow{U} F_q,$ $d_i := b_i W$ for $i = 1, \ldots, n,$ $D := (d_1, \ldots, d_n),$ and $B := (b_1, \ldots, b_n)$

[Formula 3]

$e(c, k^*)$ where $$k^* := (\overset{n}{\overrightarrow{\sigma v}})B^*,$$

$\vec{v} := v_1, \ldots, v_n,$ and $v_1, \ldots, v_n$ is the predicate information v.

4. The cryptographic system according to claim 1, wherein the basis B and the basis B* are orthonormal bases in dual pairing vector spaces.

5. The cryptographic system according to claim 1, wherein the basis B and the basis B* are bases that are generated by modifying a basis A which is predetermined using a sparse matrix having at least one value other than a constant value 0 in each row and in each column.

6. The cryptographic system according to claim 5, wherein the basis B and the basis B* are bases that are generated from the basis A, as indicated in Formula 5, using an N-row and N-column (N being an integer of n or more) linear transformation X whose values in a first row in a first column through in an n-th row in an n-th column are a sparse matrix indicated in Formula 4

[Formula 4]

$$\begin{pmatrix} \mu_1'' & \mu_2'' & \cdots & \mu_{n-1}'' & \mu''' \\ \mu & & & & \mu_2' \\ & \ddots & & & \vdots \\ & & & & \mu_{n-1}' \\ & & & & \mu_n' \end{pmatrix}$$

where $\mu, \mu_2', \ldots, \mu_n', \mu_1'', \ldots, \mu_{n-1}'',$ and $\mu'''$ are predetermined values other than the constant value 0, and a blank element denotes the constant value 0, $b_i := \Sigma_{j=1}^{N} X_{i,j} a_j$ for $i=1, \ldots, N, B:=(b_1, \ldots, b_N),$ $\vartheta_{i,j} := \psi \cdot (X^{-1})^T,$ $b^*_i := \Sigma_{j=1}^{N} \vartheta_{i,j} a_j$ for $i=1, \ldots, N, B^* := (b^*_1, \ldots, b^*_N)$  [Formula 5]

where $X_{i,j}$ denotes an entry in an i-th row in a j-th column in the linear transformation X, $\psi$ is a predetermined value, and $a_j$ is a j-th basis vector of the basis A.

7. The cryptographic system according to claim 1,
wherein the encryption device generates the ciphertext $ct_x$ including, for each index t included in a set $I_x$, an element $c_t$ in which information $J_t$ which is assigned to the index t in advance is set as a coefficient of a basis vector $d_{index}$ of the basis D, and attribute information $x_t$ among the attribute information x is set as a coefficient of another basis vector of the basis D, and wherein the decryption device decrypts the ciphertext $CT_x$ with the token $tk_v$, including, for each index t included in a set $I_v$, an element $k_t$ in which information $J^*_t$ having an inner-product of 0 with the information $J_t$ is set as a coefficient of a basis vector $b^*_{index}$ of the basis $B^*$ corresponding to the basis vector $d_{index}$, and predicate information $v_t$ among the predicate information v is set as a coefficient of another basis vector of the basis $B^*$.

8. The cryptographic system according to claim 1,
wherein the encryption device generates a ciphertext $ct_x$ in which genetic information is set as the attribute information x, and
wherein the decryption device decrypts the ciphertext $CT_x$ with the token $tk_v$ so as to search for a ciphertext $CT_x$ having genetic information satisfying a condition which is set in the token $tk_v$.

9. A cryptographic method for concealment of both attribute information and predicate information in a query, the method comprising:
generating a ciphertext $ct_x$ in which attribute information x is set as a coefficient of a basis vector of a basis D, by an encryption device;
converting, using conversion information W, the basis D of the generated ciphertext $ct_x$ to a basis B so as to generate a ciphertext $CT_x$, by a conversion device;
decrypting the generated ciphertext $CT_x$, with a token $tk_v$ in which predicate information v is set as a coefficient of a basis vector of a basis $B^*$ corresponding to the basis B, by a decryption device;
determining whether or not the ciphertext $ct_x$ satisfies a condition which is set in the token $tk_v$ based on the decryption of the ciphertext CTx; and
outputting a result of the query based on the determination.

10. A non-transitory computer readable medium, having stored there on a cryptographic program that when executed causes a computer to
generate a ciphertext $ct_x$ in which attribute information x is set as a coefficient of a basis vector of a basis D;
convert, using conversion information W the basis D of the generated ciphertext $ct_x$ to a basis B so as to generate a ciphertext $CT_x$;
decrypting the generated ciphertext $CT_x$ with a token $tk_v$ in which predicate information v is set as a coefficient of a basis vector of a basis $B^*$ corresponding to the basis B,
determining whether or not the ciphertext $ct_x$ satisfies a condition which is set in the token $tk_v$ based on the decryption of the ciphertext CTx; and
outputting a result of the query based on the determination.

11. The cryptographic system according to claim 1, wherein the cryptographic system implements an encryption scheme in a public key setting in which at least a part of basis vectors of the basis D is made public as a public key.

12. The cryptographic system according to claim 1, wherein the cryptographic system implements an encryption scheme in a secret key setting in which at least a part of basis vectors of the basis D is distributed to the encryption device as a secret key.

* * * * *